United States Patent [19]

Lerner

[11] 4,053,834

[45] Oct. 11, 1977

[54] NARROWBAND PHASE MODULATION COMMUNICATION SYSTEM WHICH ELIMINATES THRESHOLDING

[75] Inventor: Theodore Lerner, Williamsville, N.Y.

[73] Assignee: Textron, Inc., Providence, R.I.

[21] Appl. No.: 612,952

[22] Filed: Sept. 12, 1975

Related U.S. Application Data

[63] Continuation-in-part of Ser. No. 350,353, April 12, 1973, abandoned.

[51] Int. Cl.$^2$ .......................... H04B 1/62; H02B 1/00; H04B 1/10
[52] U.S. Cl. .......................................... 325/46; 325/30; 325/65; 325/145; 325/346
[58] Field of Search .......................... 325/45, 46, 63, 65, 325/145, 147, 148, 344, 346, 349, 30, 163, 320; 178/66 A, 67, 68, 88

[56] References Cited

U.S. PATENT DOCUMENTS

| | | | |
|---|---|---|---|
| 2,130,172 | 9/1938 | Armstrong | 325/145 |
| 3,638,125 | 1/1972 | Goell | 325/346 X |
| 3,651,429 | 3/1972 | Ruthroff | 325/147 X |
| 3,792,357 | 2/1974 | Hekimian et al. | 325/46 |
| 3,828,138 | 8/1974 | Fletcher et al. | 325/346 X |
| 3,924,186 | 12/1975 | Gordy et al. | 325/163 X |
| Re. 21,660 | 12/1940 | Armstrong | 325/46 |

*Primary Examiner*—Robert L. Griffin
*Assistant Examiner*—Aristotelis M. Psitos
*Attorney, Agent, or Firm*—Bean, Kauffman & Bean

[57] ABSTRACT

A narrowband phase modulation communication system is disclosed which eliminates thresholding. At the transmitter, quadrature modulation which produces very large maximum phase deviation is employed in conjunction with a constant amplitude limiter. The constant amplitude resultant contains the carrier and voice signal components in quadrature and is transmitted, at a suitable frequency, in this form. At the receiver, a narrowband phase locked loop is employed for demodulation. This demodulating loop coherently tracks the carrier component and eliminates the thresholding problem normally encountered. In a modification, the carrier component is used to transmit data either alone or in combination with the voice signal.

5 Claims, 29 Drawing Figures

NARROWBAND PHASE MODULATION COMMUNICATION SYSTEM WHICH ELIMINATES THRESHOLDING

CROSS REFERENCE TO RELATED APPLICATION

This application is a continuation-in-part of my copending application Ser. No. 350,353, filed Apr. 12, 1973 now abandoned.

BACKGROUND OF THE INVENTION

This invention relates to narrowband phase modulation systems for voice communication.

Narrowband frequency modulation (FM) systems will, by definition, exhibit significant postdetection noise and although the postdetection signal-to-noise ratio may be increased by applying conventional preemphasis and deemphasis filtering, the best that can be done is to achieve substantially flat gaussian noise in consequence of which the high frequency components of the voice signal are masked by the demodulated noise. Moreover, in any FM system there is a definite thresholding limitation which exists even when the received signal-to-noise ratio is sufficiently large as to provide an otherwise usable message signal. That is to say, although for some low value of signal-to-noise ratio the message in any event will be mutilated beyond all recognition by the noise, significant mutilation due to thresholding may begin to occur at much larger ratios. Under this latter condition, the signal and noise phasors are of nearly equal length so that if they also are of nearly opposite phase, their resultant is quite small and a small change then in noise phase yields a large phase deviation of the resultant. A sudden stepwise phase deviation is equivalent to an impulsive frequency shift and in consequence such noise-induced phase deviations produce sharp pulses or spikes at the discriminator output, recognized aurally as a click or cracking sound. This phenomenon of thresholding is well known and is characterized by the fact, apparent from the above, that it occurs randomly when the signal-to-noise ratio is otherwise useful.

BRIEF SUMMARY OF THE INVENTION

It is an object of this invention to provide a narrowband phase modulation system for voice communication in which the normal constraint of thresholding usually associated with exponential modulation systems is removed. In this way, the present system is capable of operation at much smaller signal-to-noise ratios than previously have been realized.

Freedom from the thresholding constraint is obtained by modulation-demodulation techniques. Essentially, at the transmitter large phase deviation quadrature modulation followed by constant amplitude limiting is employed, whereas the receiver includes a demodulator in which a carrier tracking phase locked loop provides a coherent frequency reference at low received signal-to-noise ratios that are well below the point where the voice signal is no longer intelligible.

Structurally, the modulator of this invention resembles a narrowband phase modulator (NBPM) conventionally employed as the heart of indirect frequency modulation systems as, for example, an Armstrong system. However, unlike such conventional arrangements wherein the maximum phase deviation of the modulation process is made very small (i.e. so that $\sin\phi \approx \phi$, when $\phi$ is the phase deviation) so as to avoid intolerable distortion, the maximum phase deviation in the present invention is made very large with respect to, but less than 90° (i.e. so that $\sin\phi \neq \phi$). As is well known, conventional FM systems using a NBPM as above employ frequency multiplication subsequent to the modulation process in order to provide the requisite deviation ratio for the transmitted signal. Thus, the present invention is chiefly characterized by an arrangement employing, in the modulating process a NBPM in which the maximum phase deviation is permitted to be very large (i.e. in the order of 60°) and this modulation process is followed by constant amplitude or hard limiting. The modulation may take place at some convenient low frequency and up conversion may be employed subsequent to modulation and hard limiting to provide the desired transmission frequency. The hard limiting produces distortion of the modulating voice signal which may be eliminated at the receiver. However, for the type of system for which the invention is intended (satellite communication with aircraft for traffic control purposes) the distortion introduced by hard limiting is not objectionable and need not be removed.

At the receiver of the present invention, the transmitted signal having large maximum phase deviation as effected by the transmitter NBPM is coherently demodulated by means of a narrowband, carrier tracking phase lock loop (PLL). The PLL is narrowband such that it coherently tracks the carrier component and demodulates the voice signal component. As a result, if there is a usable signal level present, the system will allow demodulation of the voice signal component irrespective of the signal-to-noise ratio and the well-known thresholding effect normally associated with systems of this type is eliminated.

The carrier component may be shifted back and forth in opposite phase relation, without affecting the voice signal component, for use in transmitting data as well as voice. At the transmitter, the data modulation is by differentially coded phase shift keying (DCPSK) while, at the receiver, the PLL is of the Costas type to provide the aforesaid voice signal demodulation as well as synchronous demodulation of the data.

BRIEF DESCRIPTION OF THE DRAWING FIGURES

DETAILED DESCRIPTION OF THE INVENTION

Figure 1:
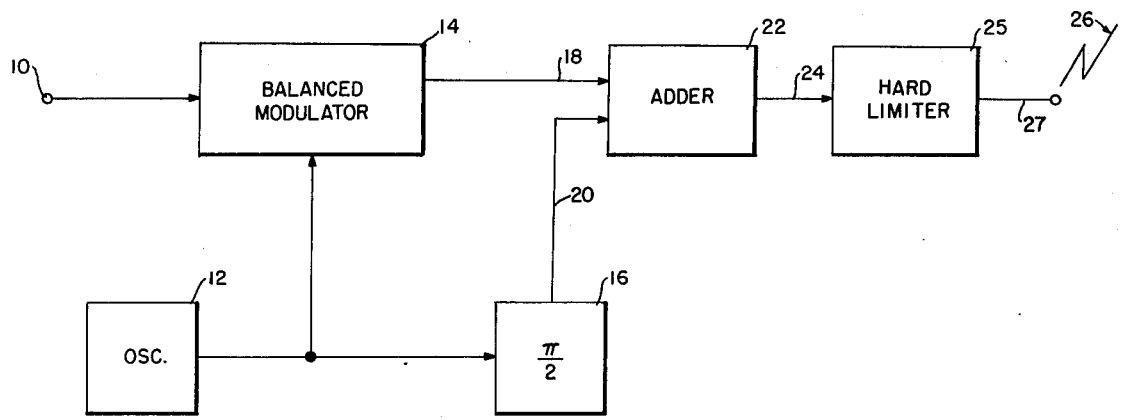
FIG. 1 is a block diagram illustrating the portion of the transmitting end of the system to demonstrate certain aspects of the modulating technique.
Figure 2:
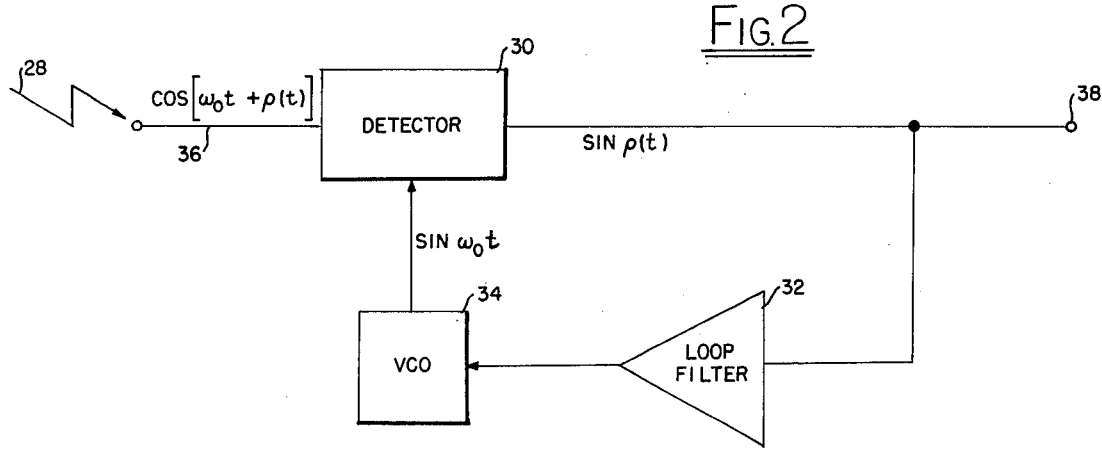
FIG. 2 is a view similar to FIG. 1 but illustrating a portion of the receiver, likewise illustrating certain aspects of the demodulation techniques.

Referring now more particularly to FIGS. 1 and 2, the basic principles of the modulation and demodulation techniques utilized in the present invention will be evident therefrom. In FIG. 1, the voice signal input at the terminal 10 and a signal from the oscillator 12 are applied to the balanced modulator or mixer 14 while a quadrature phase shift of the oscillator signal is obtained from the circuit 16 so that the modulated voice signal appearing at the line 18 and the phase shifted signal appearing at the line 20 are applied to the adder 22 to produce the quadrature modulated output at 24.

At this point, it should be noted that the arrangement of the components 12, 14 16 and 22, although identical with the arrangement of conventional Armstrong phase or frequency modulation systems, is quite different in function. In conventional systems, the maximum phase deviation is maintained very small so that the voice-modulated signal at the line 18, $V(t) \sin \omega t$ is always of substantially the same amplitude as the quadrature phase shifted signal at the line 20. In consequence, the sum signal $V(t) \cos \omega t + \sin \omega t$ appearing at the output of the adder 22 is a substantially constant envelope signal. This signal is frequency multiplied in the aforesaid Armstrong systems to yield large phase deviation.

With the modulator of this invention, the maximum phase deviation, although less than 90°, is quite large, i.e. in the order of 60°. In consequence, the signal $V(t)$ sin $\omega t$ may be quite large as compared with the signal cos $\omega t$ and the sum signal at the output of the adder 22 is not a constant amplitude signal. This is an important distinction inasmuch as the constraint of very small maximum phase deviation in conventional narrowband phase modulation is considered necessary (i.e. small deviation ratio) in order to avoid distortion.

I have found, however, that large deviation ratios may be used as noted above if the sum signal is hard limited. In FIG. 1, the hard limiter 25 causes the sum signal to be of constant amplitude at its output 27 and is easily transmitted, as indicated at 26, by conventional equipment. The hard limiting introduces nonlinearity which may be compensated in the receiver, although I have found that such compensation or restoration of linearity is not essential because lack of it does not significantly affect the intelligibility and quality of the demodulated voice signal.

The signal is transmitted for reception, as indicated at 28 in FIG. 2, by the receiver. The received signal is detected at 30 by means of the narrowband coherent phase tracking loop formed by the narrowband loop filter 32 which controls the voltage controlled oscillator 34 so as coherently to track the carrier component of the incoming received signal at 36 whereby the voice component signal appears at the output 38.

Figure 3:
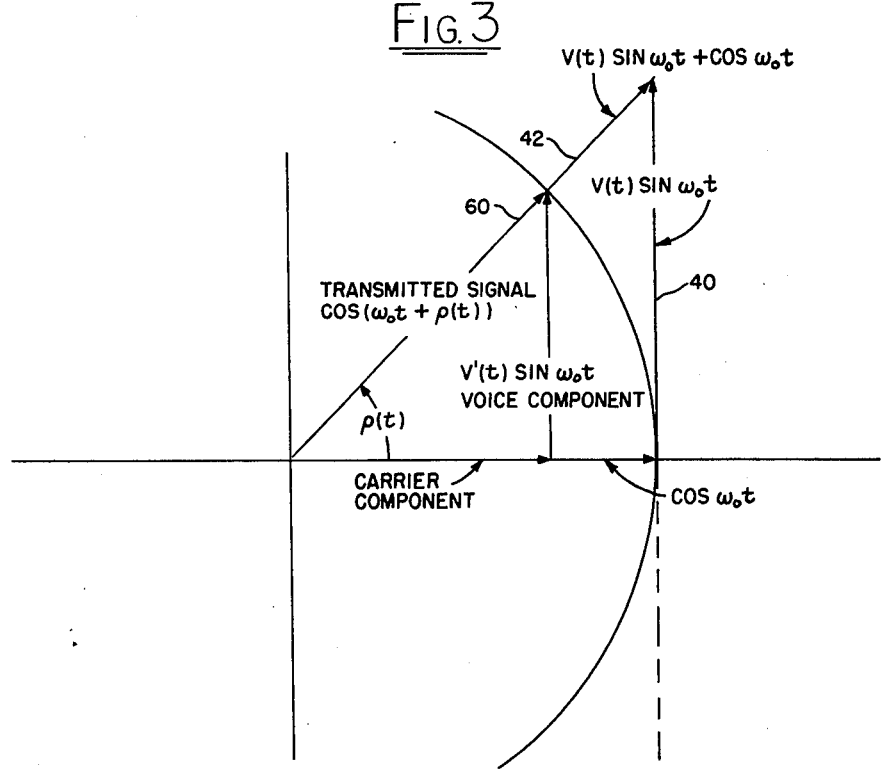
FIG. 3 is a vector diagram associated with FIGS. 1 and 2 and with FIG. 4 to illustrate certain aspects of the present invention.

When the voice signal $V(t)$ is permitted to produce a maximum phase deviation which is relatively large (i.e. in the order to 60°) the vector diagram of FIG. 3 will prevail. In FIG. 3, the vector indicated at 40 is the output of the balanced mixer 14 in FIG. 1, the output of the oscillator 12 being sin $\omega_o t$, the output of the phase shifter 16 will be the vector cos $\omega_o t$, and the output of the adder 22 is the sum signal or resultant as indicated at 42 (FIG. 3). As has been noted, with such large maximum permissible phase deviations, the amplitude of the adder 22 is variable and the hard limiter is used to provide the constant envelope signal cos $[\omega_o t + p(t)]$ as illustrated at 60.

As has been noted previously, the modulator-demodulator combination provides for a system in which the normally encountered thresholding problem is absent. As noted, FM systems are notorious for this problem and it can be very serious under conditions in which the signal-to-noise ratio may be expected normally to be low as, for example, in any system where the power available for transmission is not great. Under these conditions, the thresholding problem is very serious because the signal otherwise would be useful, i.e. the signal is perfectly usable and intelligible were it not for the thresholding problem.

The system of the present invention eliminates this problem because the demodulator is able to track the carrier down to signal-to-noise ratios which are well below the level at which the signal is useful.

In the present invention, the quadrature modulation technique provides for nonthresholding demodulation of the voice signal. The demodulator tracks and locks on to the carrier and cannot follow the voice modulated component. In consequence, a coherent frequency reference is provided even at low received signal-to-noise ratios.

Figure 4:
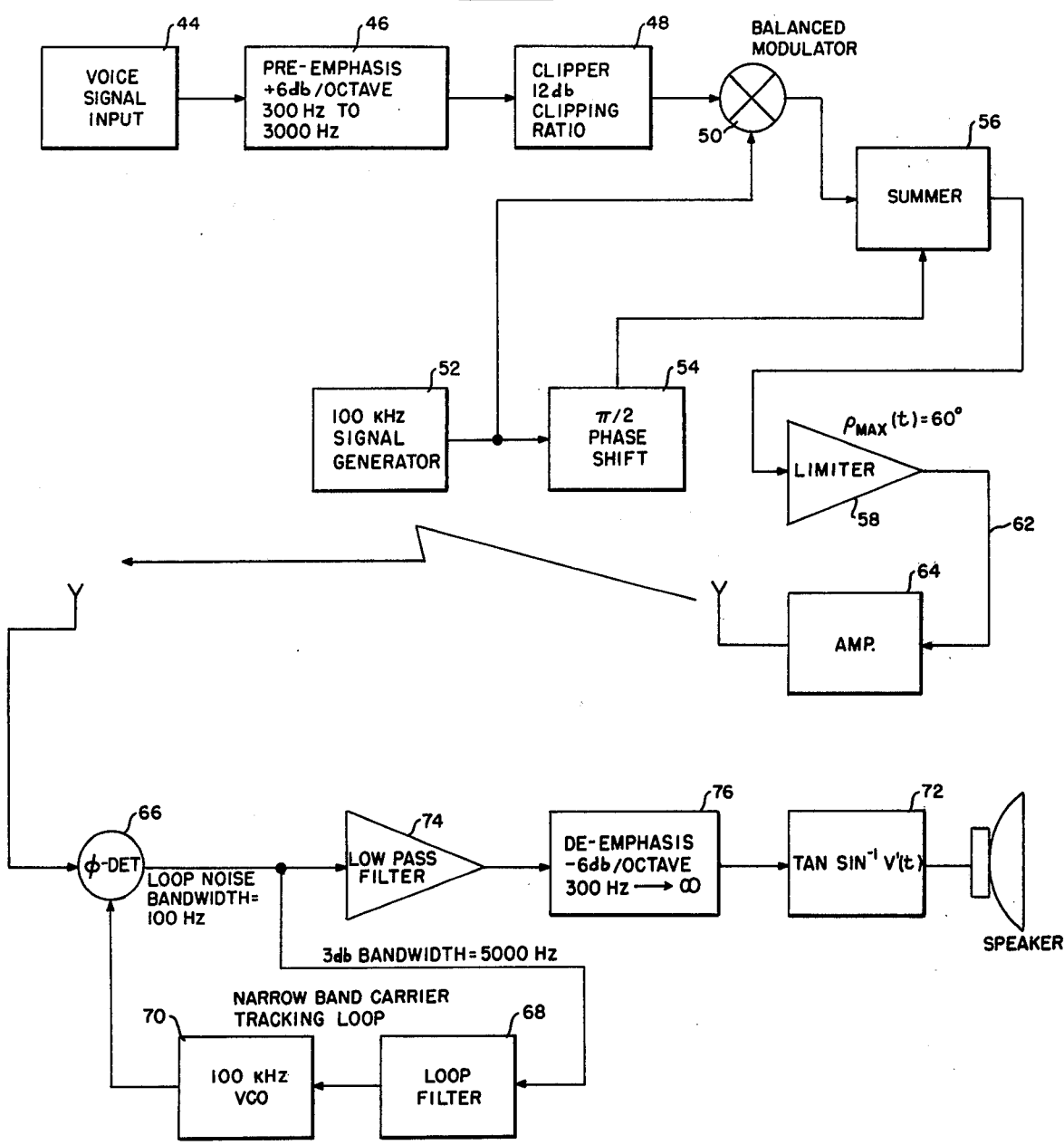
FIG. 4 is a diagrammatic view illustrating transmitting and receiving portions of the system and depicting further aspects of the invention.

FIG. 4 illustrates a practical embodiment of the invention. In FIG. 4, the voice signal input as obtained at 44 is applied through a preemphasis network as indicated by the reference character 46, the purpose of which will be presently apparent and through a clipper circuit 48 to the balanced modulator or mixer 50 which corresponds to mixer 14 of FIG. 1. The oscillator 52 corresponds to the oscillator 12 in FIG. 1, the phase shifting circuit 54 of FIG. 4 corresponds to the circuit 16 of FIG. 1 and the summing device 56 of FIG. 4 corresponds to the adder 22 of FIG. 1. The output of the summing circuit 56 is applied to a hard limiter 58 which, as will be evident by reference to FIG. 3, causes the constant amplitude resultant output 60 to appear at the output 62 in FIG. 4.

As noted, in the modulator the sum signal $V(t) \sin \omega_o t + \cos \omega_o t$ is not a constant envelope signal because $V(t) \sin \omega_o t$ can be larger than $\cos \omega_o t$. To yield a constant amplitude signal, the sum signal is passed through the hard limiter 58 so that the quadrature modulator generates a constant envelope carrier of frequency $(\omega_o/2$ and a phase angle $\phi = p(t)$, where $p(t) = \tan^{-1}V_{(t)}$ which constant envelope carrier is readily transmitted using efficient Class-C amplifier means 64 as shown in FIG. 4.

The angle of voice modulation, $p(t)$ (FIG. 3), determines the ratio of power in the carrier, $\cos \omega_o t$, to the power in the voice component, $V(t) \sin \omega_o t$. If the maximum angle of modulation is held to 60°, then at peak voice modulation one-fourth of the total transmitted power is in the carrier and three/fourths of the power is in the voice signal. At the demodulator, for a total received signal-to-noise spectral density of 56 db-Hz, for example, the minimum carrier signal-to-noise spectral density would be 40 db-Hz and the voice signal-to-noise spectral density would be 44.75 db-Hz at periods of peak modulation.

The receiver portion shown in FIG. 4 includes the phase detector 66, the loop filter 68 and the voltage controlled oscillator 70, as shown. In this way, a narrowband carrier tracking loop is effected to provide a coherent frequency reference for demodulation of the received signal. Basically, the demodulator tracks the carrier and demodulates the signal component which is in quadrature with the carrier. With reference to FIG. 3, the demodulated signal component is $V'(t) \sin \omega_o t$.

As will be evident, $V'(t) = \sin \tan^{-1}V(t)$ and the inverse trigonometric operation $\tan \sin^{-1}V'(t)$ is performed at 72 to recover the original voice signal $V(t)$. As noted before, however, the elimination of nonlinearity introduced by the hard limiter 58 is not necessary.

The signal from the phase locked loop is passed through the low pass filter 74 which typically as shown will have a 3 dB bandwidth of 5000 Hz and is then passed through the deemphasis filter 76 which, as noted, essentially restores the voice signal to its original form as necessitated by the preemphasis circuit 46 at the transmitter.

Figure 5:
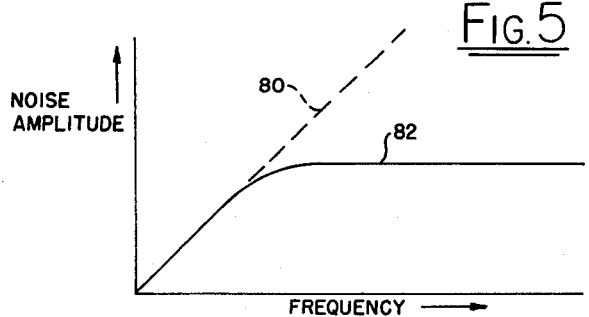
FIG. 5 is a graph showing the effect of a deemphasis in a frequency modulated system.

In frequency modulation systems, the amplitude of the noise after demodulation increases with frequency as indicated by the dashed line 80 in FIG. 5 and by proper filtering techniques, a noise amplitude curve as indicated by the full line 82 in FIG. 5 may be obtained so that the noise is flat at the higher frequencies. In such systems, it is of course necessary to add a corresponding amount of preemphasis before voice modulation at the transmitter to compensate for the deemphasis filtering which produces the full line curve of FIG. 5. In any event, the flat noise at higher frequencies causes the higher frequency components of the voice signal to be buried in this noise and much if not all of this information is not recovered at the receiver if the signal-to-noise ratio of the received signal is low.

Figure 6:
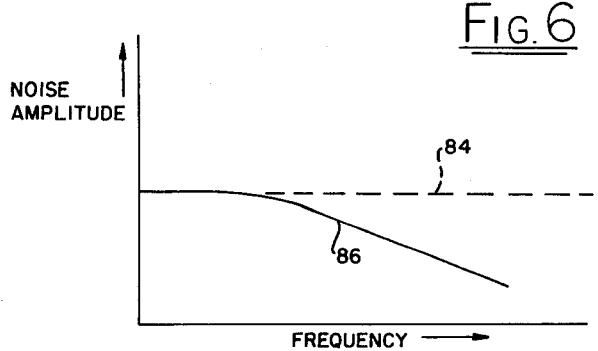
FIG. 6 is a graph illustrating the effect of deemphasis according to the present invention.

In contrast, according to the present invention, the phase quadrature modulation and narrowband coherent tracking demodulator produces a noise output at the demodulator which is substantially flat and quassian as indicated by the dashed line 84 in FIG. 6.

Thus, with postdetection deemphasis filtering as indicated by the deemphasis filter 76 in FIG. 4, for example, the noise amplitude is caused to roll off at the higher frequencies as indicated by the full line curve 86 in FIG. 6. With the preemphasis circuit 46 in cooperation with the deemphasis circuit 76, the recovered voice signal is essentially unmodified but now the higher frequency components of the voice signal will not be buried in the postdetection noise after deemphasis and a significant improvement in voice quality and intelligibility results.

Figure 7:
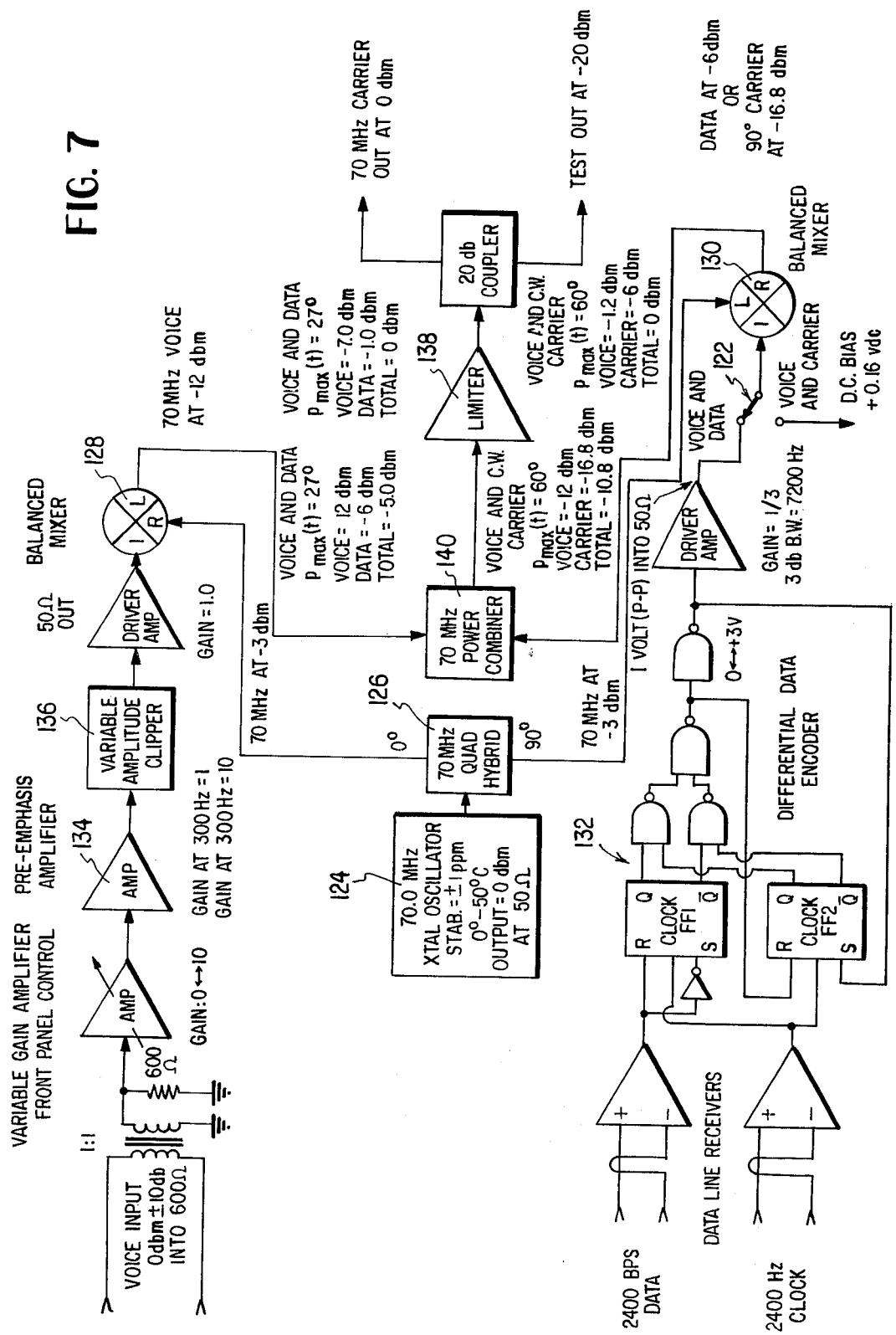
FIG. 7 is a diagrammatic view illustrating another embodiment of the transmitter.
Figure 8:
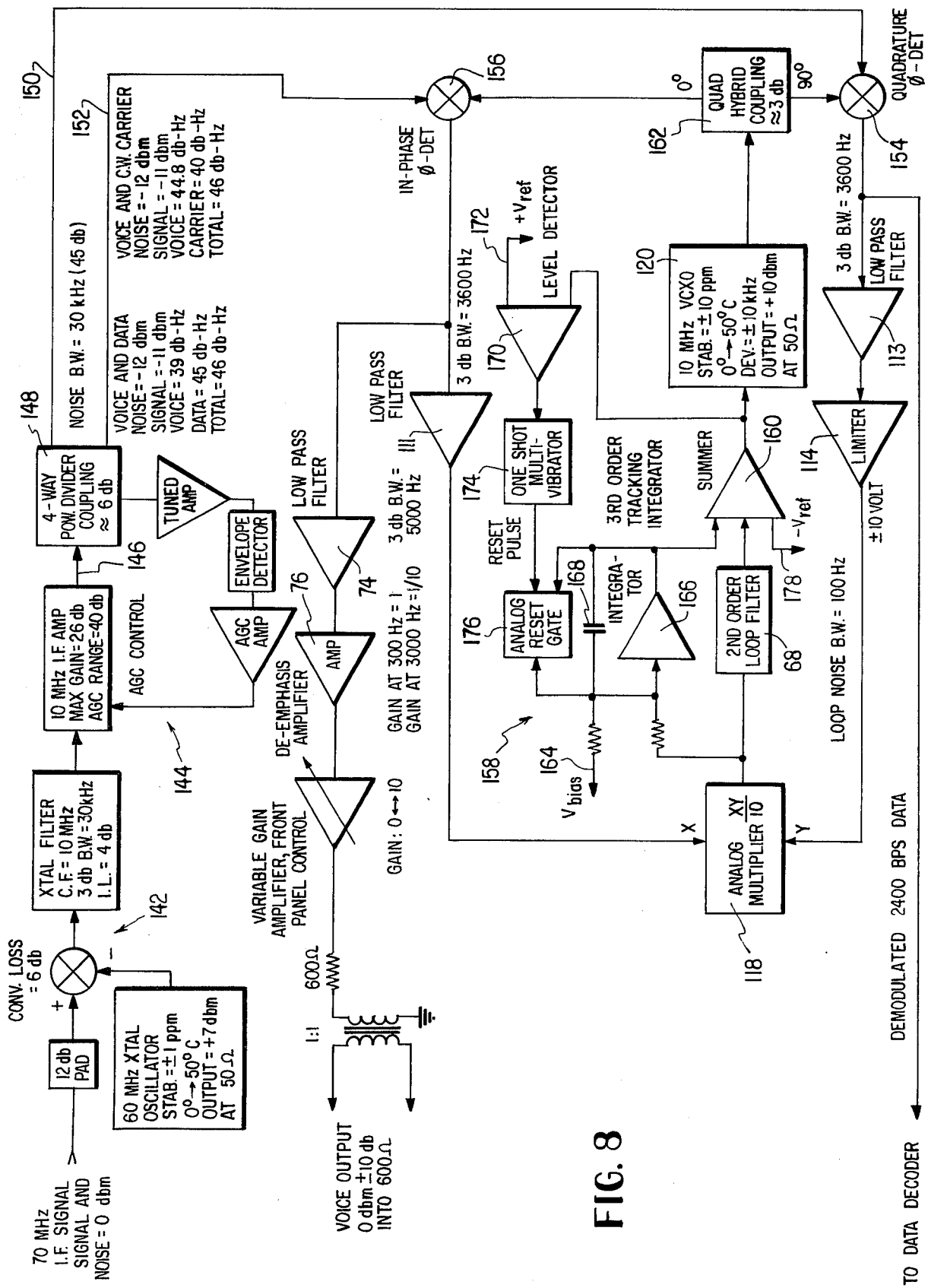
FIG. 8 is a diagram of the receiver used with FIG. 7.
Figure 10:
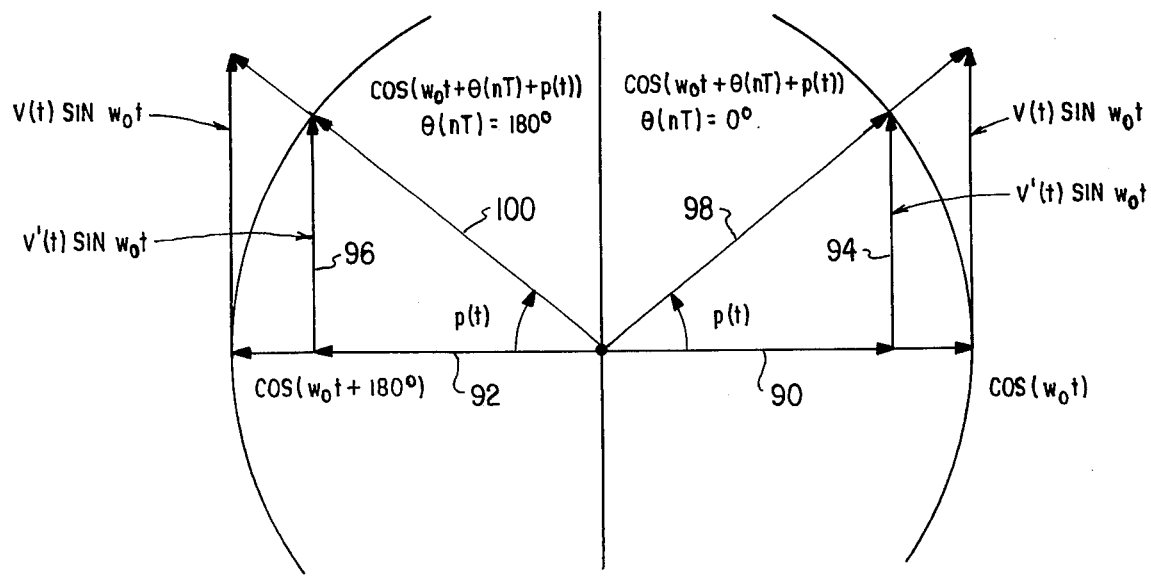
FIG. 10 is a diagram illustrating certain principles of FIGS. 7-9.

FIGS. 7 and 8 illustrate one embodiment of the transmitter and receiver respectively wherein the system has been modified to employ the carrier component to transmit data information together with the quadrature voice signal component. The system may also be used for voice alone or for data alone as will be presently apparent. FIG. 10 illustrates a vector diagram of the combined systems wherein it will be seen that a vector 90 constituting the carrier component transmitted may represent a binary "1", for example, whereas the phase-reversed carrier component 92 represents a binary "0". It will be seen that the polarity of the voice signal component 94 or 96 will remain the same in either case. The amplitude of the transmitted signal 98 or 100 is constant and of course the amplitudes of the carrier components 90 and 92 are determined by the amplitudes of the voice signal components 94, 96 as will be evident.

Figure 9:
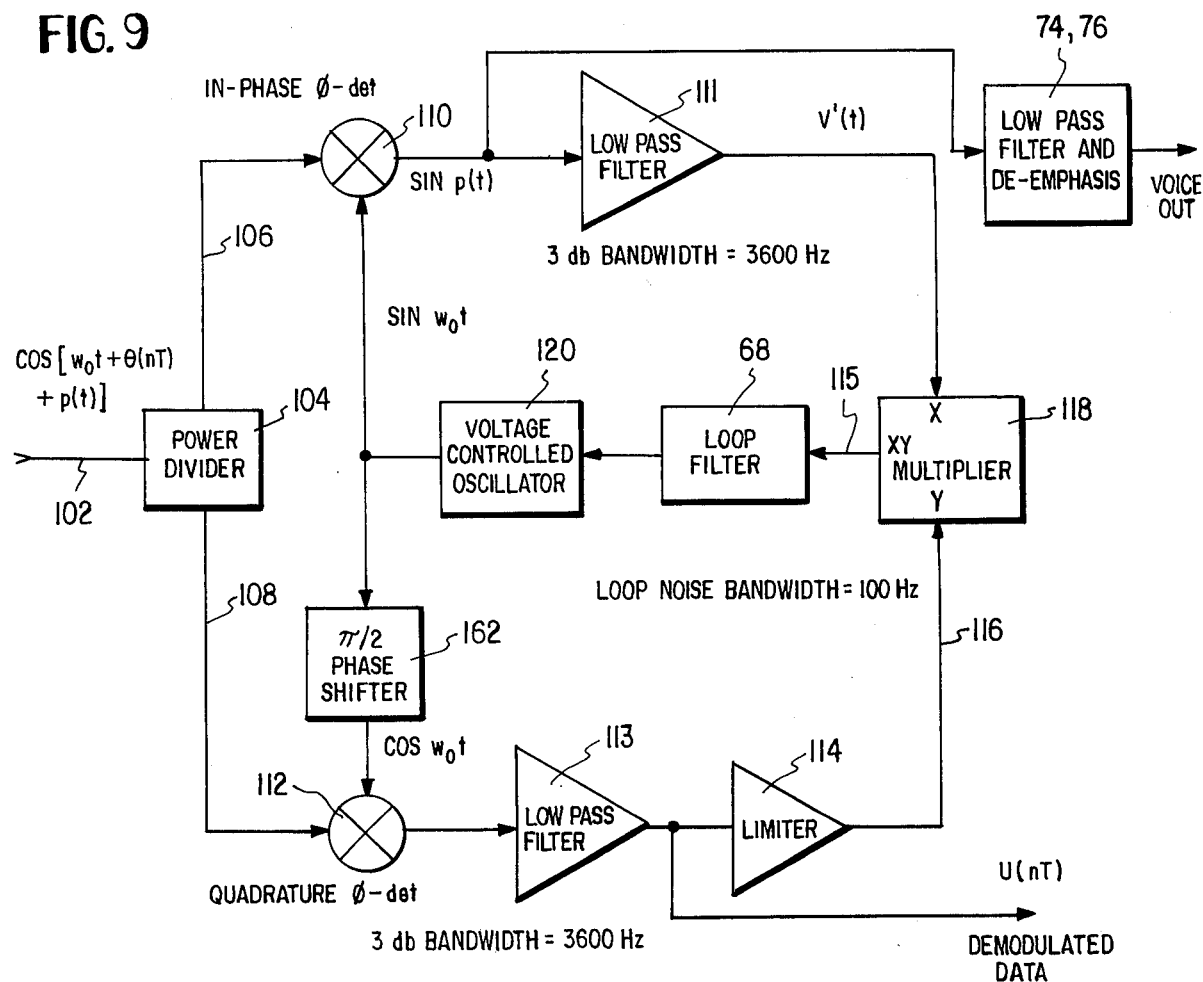
FIG. 9 is a diagram of the Costas loop demodulator employed in FIG. 8.

The demodulator portion of the receiver is illustrated in FIG. 9 where it will be seen that the received signals at 102 is applied to a power divider 104 wherein the signal is split between the lines 106 and 108 for application respectively to the balanced mixers which operate as phase detectors 110 and 112. The loop shown in FIG. 9 is a no-carrier tracking loop which generates a coherent reference frequency for demodulation of the data and voice signals. The loop is also designed to demodulate voice only or data only. If voice only is being transmitted, the quadrature phase detector 112 demodulates the d.c. component of the carrier and drives the limiter 114 into saturation so that its output at 116 is a constant d.c. signal which is applied to the Y port of a multiplier 118. Because of the constant level d.c. signal applied at the Y port of the multiplier 118, the multiplier 118 now operates as an amplifier with respect to its X port so that there will now be a DC path from the in-phase detector 110 to the voltage controlled oscillator 120 for tracking the carrier component. During the transmission of data alone, the demodulator operates as a Costas loop. The input signal $\pm \cos \omega_o t$ are multiplied by the reference signal output of the VCO 120 and by the reference signal shifted by 90° at the detectors 110 and 112 respectively. The reference signal, in the absence of the voice signal component, is $\sin (\omega_o t + \theta)$ where $\theta$ is the angular error. The output of the detector 110 is now $\sin \theta$ whereas the output of the detector 112 is $\cos\theta$, which signals after low pass filtering at 111 and 113 are multiplied together to yield the output signal $\sin\theta \cos\theta$ at the output 115 of the multiplier 118. This signal, then, is proportional to $\sin 2\theta$ and the polarity of this error signal is independent of the polarity of the input signal. Since the error signal goes through zero with a positive slope at $\theta$ equal to 0° and 180°, the loop has two stable lock conditions.

In FIG. 7, an arrangement is shown for the simultaneous or separate transmission of voice signals and differentially coherent phase shift keyed data. The switch 122 is provided for selection as between simultaneous transmission of voice and data and transmission of voice alone. As will be clearly recognized from FIG. 7, the narrowband phase modulation portion of the system includes the crystal controlled oscillator 124, the 90° phase shifter 126, the balanced mixer 128 and the mixer 130 which, dependent upon the disposition of the switch 122, adds the quadrature components of the carrier and voice signal or the quadrature components which are the data signal and the voice component. A conventional data encoder is indicated generally by the reference character 132.

The preemphasis amplifier 134 and the clipping circuit 136, previously described, are disposed in the system as indicated and the limiter 138 of course corresponds to the limiter 58 of FIG. 4, for example. Because for high data rates more power ordinarily will be required to transmit the data as compared to that required to transmit the voice, the limiter 138 limits the maximum phase deviation of the voice signal when voice and data both are being transmitted. The power combines 140 of course corresponds to the summing circuit 56 of FIG. 4.

In FIG. 8, the receiver as shown includes a conventional I.F. stage 142 and I.F. amplifier stage 144 with automatic gain control as shown, the output of which at 146 is applied to a power divider 148 having outputs 150 and 152 applied respectively to the quadrature phase detector 154 and the in-phase detector 156. The output of the multiplier 118 is applied to the loop filter 68 and to the third order tracking integrator 158 and the signals therefrom are applied to the summer 160. The 10M Hz center frequency signal from the voltage-controlled oscillator 120 is fed through the quadrature hydrid 162 to the two phase detectors 154 and 156. The Costas loop is a third order phase locked loop, the third order pole being generated by the integrator network 158 which operates to search, acquire and track the signal over the received Doppler range.

When the loop is not in phase lock, there is no d.c. control voltage at the output of the multiplier 118 and the d.c. bias at 164 provides a slowly increasing ramp at the output of the integrator amplifier 166 because of the feed back capacitor 168. This ramp signal is summed at 160 with the signal from the second order loop filter 68 and a search ramp is applied to the VCO 120. In this particular embodiment, the reference Vref at the input 172 to the level detector 170 is chosen to provide +5K Hz sweep and the negative ref-V at the input 178 to the summer 160 causes the search ramp to commence at a level corresponding to −5K Hz sweep. During a ramp search period, if a signal is received the Costas loop will acquire lock as the VCO 120 is swept within the loop acquisition range. The bias current developed by the input at 164 is much smaller than the bias current developed by the control voltage at the output of the multiplier 118 once the loop has acquired lock. Theoretically, a third order loop has zero phase error over the range of received Doppler frequencies; however, the bias at 164 will develop a certain static phase error. The ramp sweep time versus tracking time constant is designed to hold this static phase error to less that 5°.

While the integrator time constants are designed for ramp sweep time and Doppler tracking rates, the second order loop filter 68 is designed to develop a loop noise bandwidth of 100 Hz. Since the integrator time constant is mush greater than the second order loop filter time constants, the third order pole is made sufficiently far removed from the first and second order poles as to provide loop stability over the expected range of received signal levels.

As noted, the Costas loop operates simply as a phase locked loop during periods of voice transmission only. In this case, the demodulator tracks the received 90° carrier component and provides a coherent reference frequency for demodulation of the voice signal. When the loop acquires lock the received carrier component will be detected as a d.c. level output of the detector 154, which d.c. level output drives the limiter 114 to +10 volt output so that the transfer characteristics of the multiplier 118 will be that of a unity gain amplifier. The loop noise bandwidth will remain the same in either mode of operation and will also retain the same aquisition and tracking characteristics.

Figure 11:
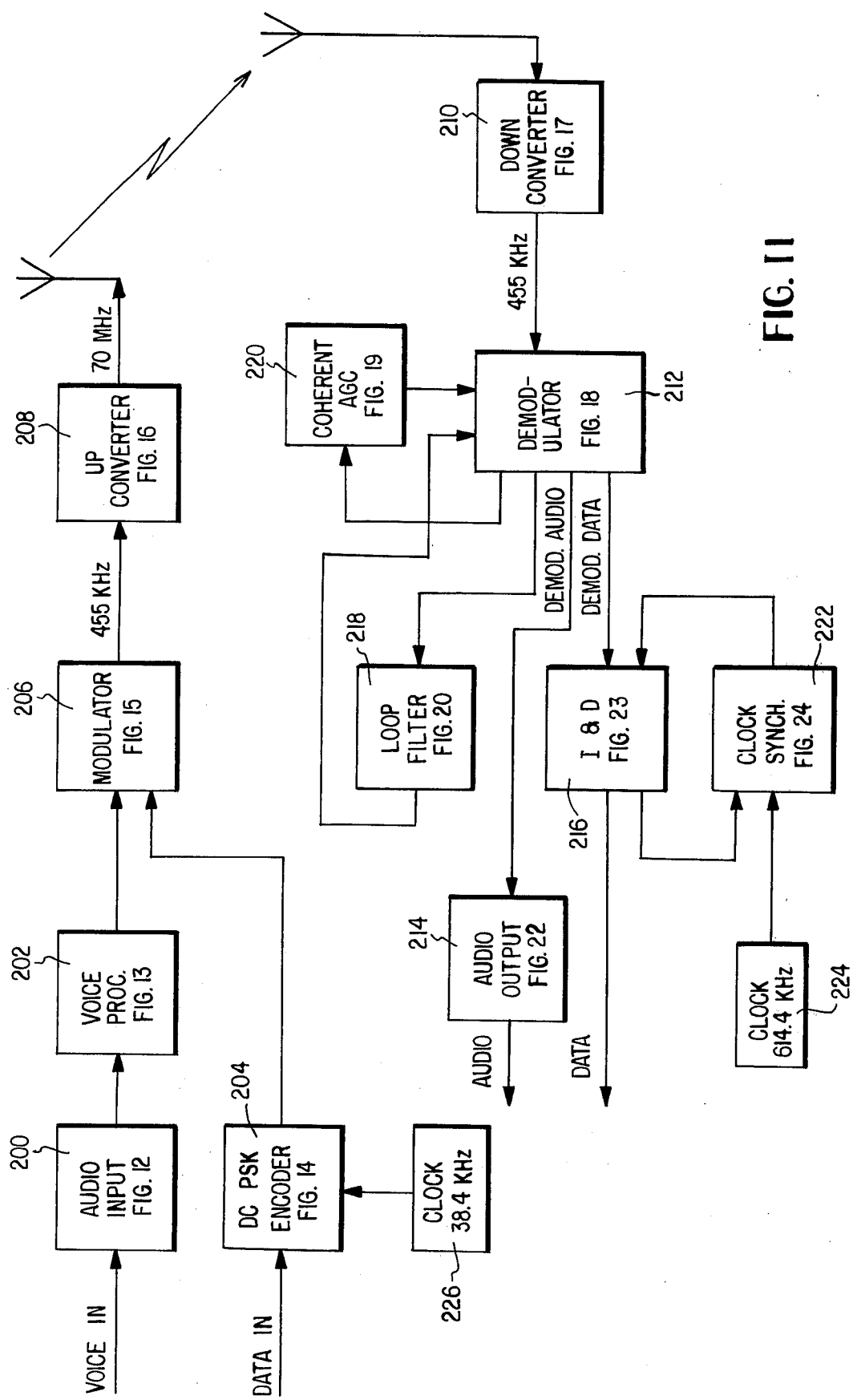
FIG. 11 is a block diagram of a preferred embodiment of the invention.

FIG. 11 is a simplified block diagram of a preferred embodiment of the invention and also provides a map for the corresponding Figures of the various networks depicted. In FIG. 11, the audio input network 200 is utilized to provide variable gain and also to attenuate all low frequency voice components below 300 Hz. The voice processing network 202 contains a preemphasis network and a voltage compressor network for processing the voltage signals. The network 204 receives data input and encodes the data differentially according to the following format:

| INPUT BIT AT T = N | TRANSMITTED BIT AT T = N-1 | TRANSMITTED BIT AT T = N |
|---|---|---|
| 0 | 0 | 0 |
| 0 | 1 | 1 |
| 1 | 0 | 1 |
| 1 | 1 | 0 |

The audio and encoded data inputs are applied to the modulator 206 and the resultant 455K Hz signal is converted to the output 70M Hz signal by the up-converter network 208.

The receiver portion of the system includes the down-converter network 210 which provides the 455K Hz signal which is applied to the demodulator network 212. The network 212 provides various outputs in addition to the demodulated audio and demodulated data signals which are applied respectively to the audio output network 214 and the integrate and dump network 216. These additional outputs are applied to the loop filter network 218 and the coherent automatic gain control network 220. Associated with the integrate and dump network 216 is a clock synchronizing loop 222 which is provided with input from a clock 244 which, similarly to the clock 226 for the transmitter portion of a system provides a highly stable clock input.

Figure 12:
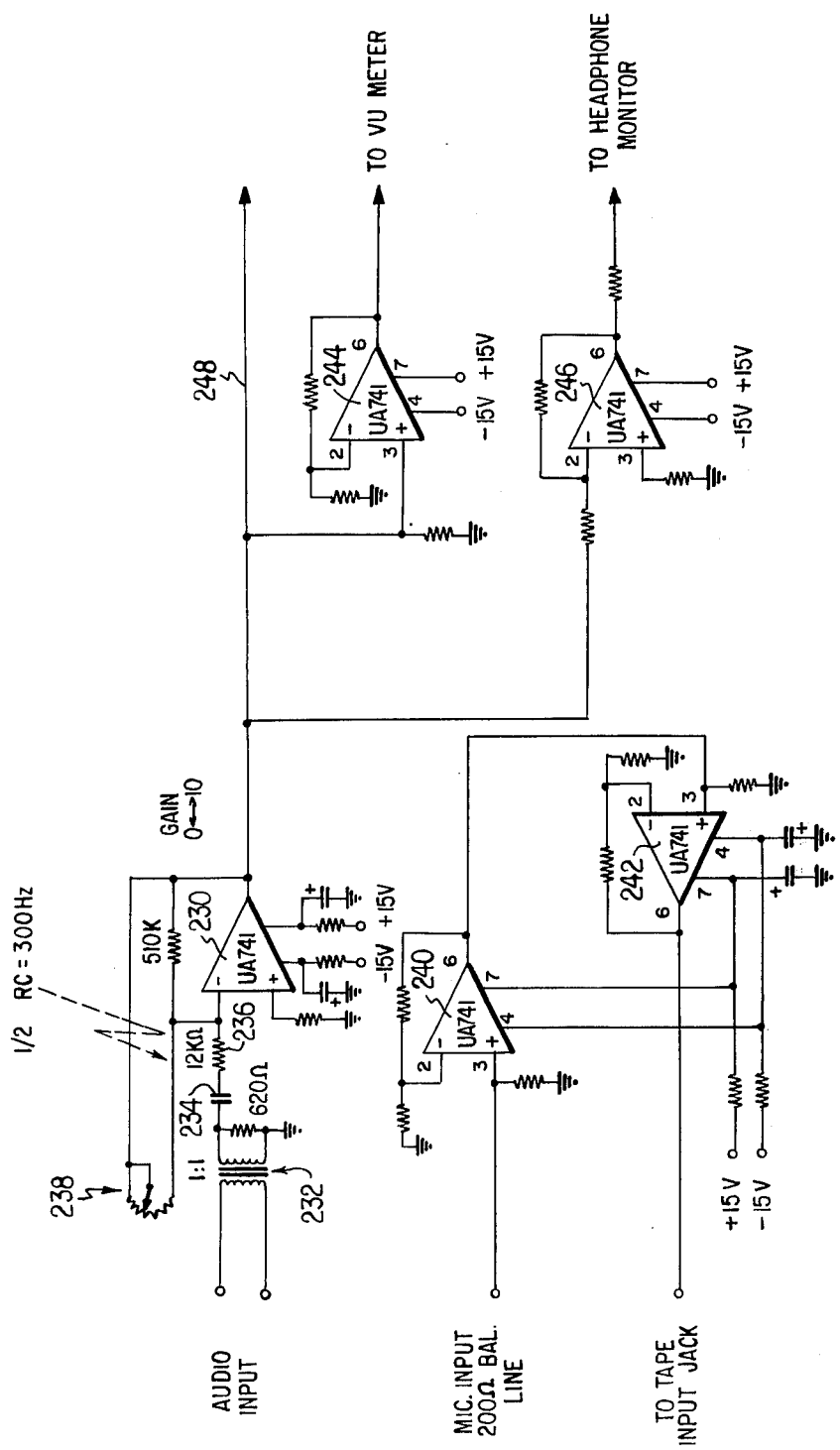
FIG. 12 is a circuit diagram showing the audio input circuit of FIG. 11.

With reference to the audio input network 200 which is illustrated in FIG. 12, the audio input signal is applied to the variable gain amplifier 230 by means of the transformer 232 and the high pass R-C network provided by the capacitor 234 and the resistor 236 whose values are chosen to provide the relationship as shown. Audio gain control is provided by the control resistor 238 as illustrated. Additional components mounted on the circuit board illustrated in FIG. 12 are the two amplifiers 240 and 242 for recording the audio input and the amplifiers 244 and 246 respectively for the meter output and headphone monitor output as indicated.

As noted, the input transformer 232 and high pass R-C network 234, 236 are provided to attenuate all the frequency voice components below 300 Hz, first of all because voice frequency components below 300 Hz contribute little to the overall speaker intelligibility and transmitter power should be conserved for the transmission of voice signals which contribute most to received voice intelligibility. Further and more importantly, it is desirable to eliminate voice signals which are low in frequency and within the noise bandwidth of the carrier tracking loop of the coherent demolulator section 212 of the receiver, see FIG. 11. At the receiver, the 6 dB bandwidth of the carrier tracking loop in the network 212 is 150 Hz and any voice components within this loop bandwidth tend to disrupt the demodulator carrier tracking performance. The frequency response of the audio input network of FIG. 12 and as indicated at 200 in FIG. 11 is such that frequencies below 100 Hz are severely attenuated. It is to be understood that the output at 248 is adjusted by the front panel control 238 to provide for peak readings of 0 at the monitoring meter driven by the amplifier 244.

Figure 13:
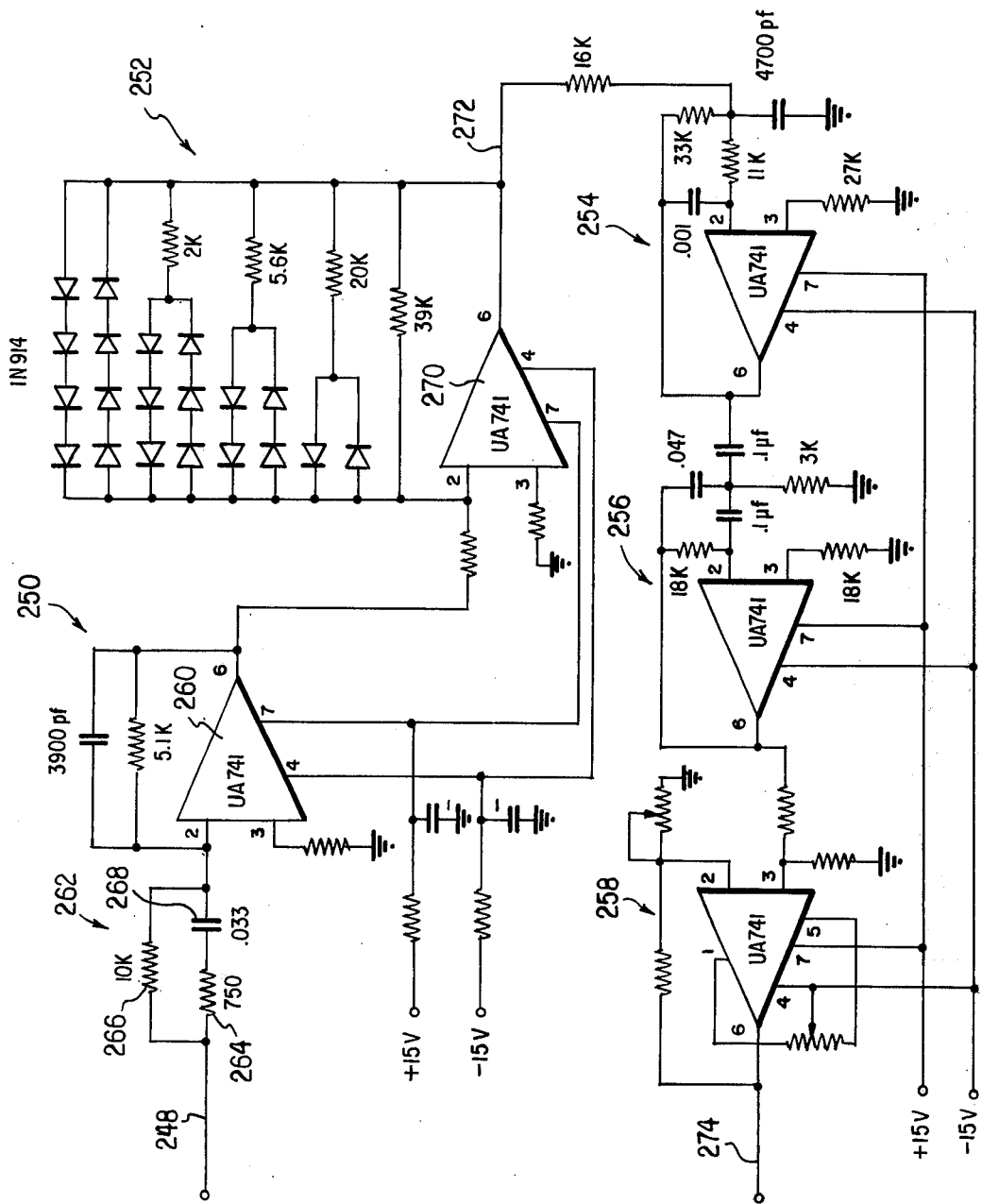
FIG. 13 is a circuit diagram of the voice processor of FIG. 11.

The processing network 202 is illustrated in FIG. 13 and consists essentially of a preemphasis network indicated generally by the reference character 250 followed by the voltage compressor network indicated generally by the reference character 252, the low pass filter network indicated generally by the reference character 254, the high pass filter network indicated generally by the reference character 256, and the variable gain amplifier network indicated generally by the reference character 258. The amplifier 260 and the filter network 262 preceeding it and consisting of the R1 resistor 264, the R2 resistor 266 and the capacitor 268 provide +6 dB/octave increase in AC gain from 500 Hz to 6500 Hz serving to equalize the voice spectrum over this frequency range. The typical voice spectrum is not flat over this frequency range and the high frequency voice components are often masked by noise is communication systems. The frequency response of the preemphasis network serves to attenuate those low frequency voice components which contribute little to voice intelligibility while the higher frequency components are amplified so as to equalize the overall voice spectrum.

However, frequency processing is but one part of equalizing the voice signal and the amplitude processing system 252 is also employed. That is to say, not only is the typical voice spectrum unbalanced with respect to the frequency, but the amplitude distribution of the voice signal also varies greatly. In fact, the peak to RMS ratio for typical speakers often reaches 20 dB and very little information contributing to intelligibility is carried in the random peaks of a speaker. Although the level of the lower power voice components are often increased by processing through a clipper, a clipper will chop off high level voice peaks and will linearly pass the low level voice signals, introducing distortion in the voice signal which often results in a deterioration in speaker intelligibility at clipping levels greater than 24 dB. For this reason, the compressor network 252 is utilized instead of a clipper network. The voltage transfer characteristic of the diode compressor network 252 operating in conjunction with the amplifier 270 is such as to provide a gain of 26 dB for low level input signals and unity gain for high level signals. large voice peaks are rounded off rather than clipped thereby reducing the harmonic distortion inherent with a clipper. The peak to RMS ratio of the voice signal is reduced by the compressor so that the low level phonemes of a speaker are now higher in power. Since it is the low level phonemes of a voice signal which determine speech intelligibility, speech intelligibility is reduced when these signals are masked by noise. The compressor network system shown in FIG. 13 amplifies the low level phonemes and reduces random peak signals, thus normalizing the amplitude distribution of the voice signal at the output 272.

The processed voice signal is passed through the low pass filter 254 which is employed to restrict the transmission bandwidth and remove unwanted harmonic signals outside the band of interest. This filter as depicted is a 3500 Hz, 2 pole, low pass Butterworth filter. The 300 Hz, 2 pole, high pass Butterworth filter 256 provides additional filtering of undesired low frequency voice components that are amplified by the compressor network. The signal from the high pass filter 256 is fed through the variable gain amplifier 258 which controls the level of the audio modulation output at 274. The output level at 274 is set to ± 9 volts for nominal inputs of 0 as monitored at the front panel V-U meter.

Figure 14:
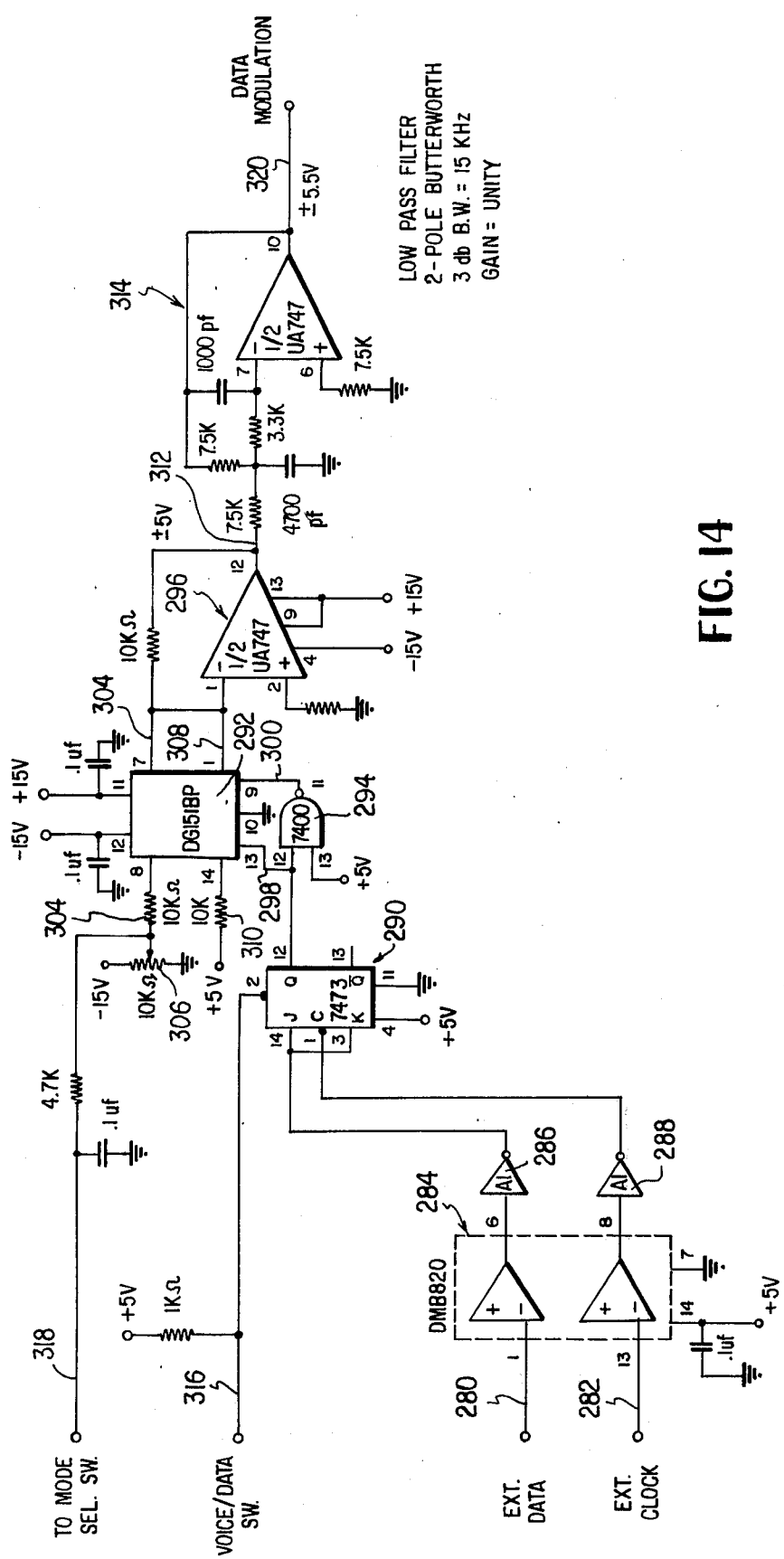
FIG. 14 is a circuit diagram of the encoder and associated circuits of FIG. 11.

With reference now more particularly to FIG. 14, the differential coherent phase shift keying (DCPSK) encoder system is illustrated therein. As shown, the external data and the signal from the external clock 226 (see FIG. 11) are applied respectively at the inputs 280 and 282 to the buffer amplifiers 284 and inverters 286 and 288 to the flip-flop circuit 290 whereat the TTL compatible DCPSK conversion takes place. The simple JK flip-flop, connected as shown, has been found effective to provide the requisite encoding and is used to replace the more complicated but conventional circuit 132 of FIG. 7. The two channel switching circuit 292 and NAND gate 194 operate in conjunction with the amplifier 196 to convert the TTL compatible signal to a bipolar analog signal swinging between ±5 volts. The conductors 298 and 300 control the internal switching circuits of the switching device 292, one effecting to connect and disconnect the channel 1 output 302 to the negative voltage source through the resistor 304 and the potentiometer 306 whereas the other serves to connect and disconnect the channel 2 output 308 to the ±5 volt source through the resistor 310. The NAND gate 294 causes one channel to be switched closed while the other opens and vice versa so that the output 312 of the amplifier 296 swings between ± volts DC. The network 314 is a two pole Butterworth low pass filter provided to clean up the data modulation signal.

The conductor 316 is connected to a voice/data switch to set the Q output of the flip-flop 290 such that the channel one switch is closed while the channel two switch is closed in the switching circuit 292 when the switch is in the voice mode. At the same time, the mode select switch provides an input to the conductor 318 when the "voice only" mode such that when in this mode, the output of the network 314 is a constant −2.6 volts d.c. so as continuously to modulate the residual carrier component of the voice signal when the selected mode is "voice only". In the other two modes, namely, "data only" and "voice plus data" the output of the filter network 314 swings between ±5.5 volts d.c. as indicated in FIG. 14.

Figure 15:
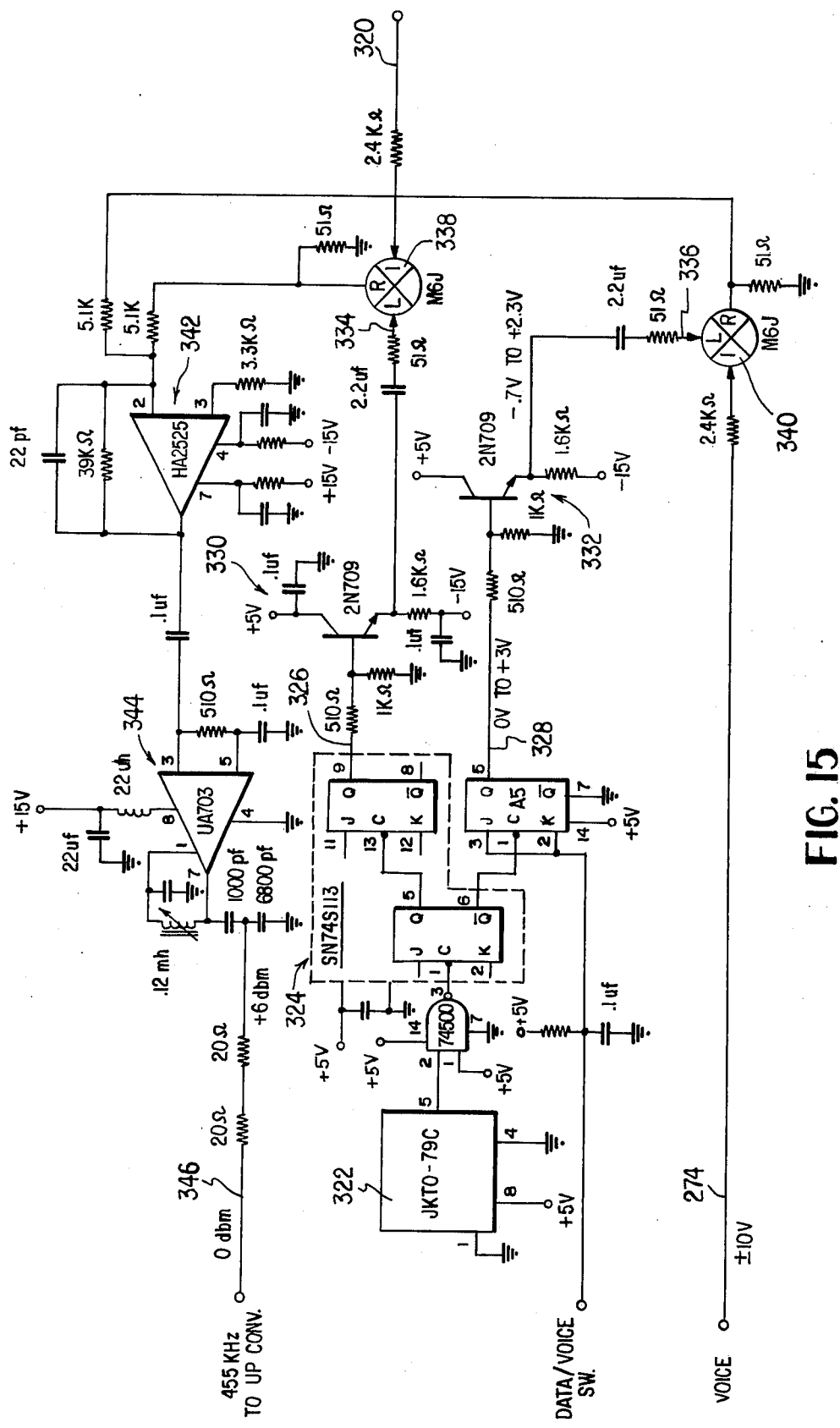
FIG. 15 is a circuit diagram of the modulator of FIG. 11.

The quadrature modulator is illustrated in FIG. 15. At the modulator the audio and data signals are modulated onto the 0° and 90° phase components of the 455K Hz carrier. The 455K Hz carrier at 0° and 90° are generated in a digital quadrature hybrid which divides a 1.82M Hz reference frequency by a factor of four. A digital quadrature hybrid configuration is utilized to generate the reference carriers because a high degree of quadrature balance is required to eliminate channel cross-talk. The digital hybrid used in FIG. 15 incorporates Schottky TTL logic circuits and 455K Hz produces a phase error of only 0.33° which assures that the level of data at the audio channel is down 45 dB. Specifically the output of a stable oscillator 322 is gated to the hydrid circuit 324 to produce the quadrature TTL compatible components at the outputs 326 and 328. TTL-to-bipolar conversion is effected by the transistor circuits 330 and 332 and the resultant bipolar signals at 334 and 336 are applied to the respective doubly balanced mixers 338 and 340. The other inputs to these respective mixers are the data modulation at the conductor 320 from the circuitry of FIG. 14 and the voice modulation signal at the conductor 274 from the circuit of FIG. 15. The outputs from the two mixers 338 and 340 are summed by the wide band amplifier 342 and then fed through the bandpass limiter network 344 to provide the modulated 455K Hz output signal at the conductor 346.

Figure 16:
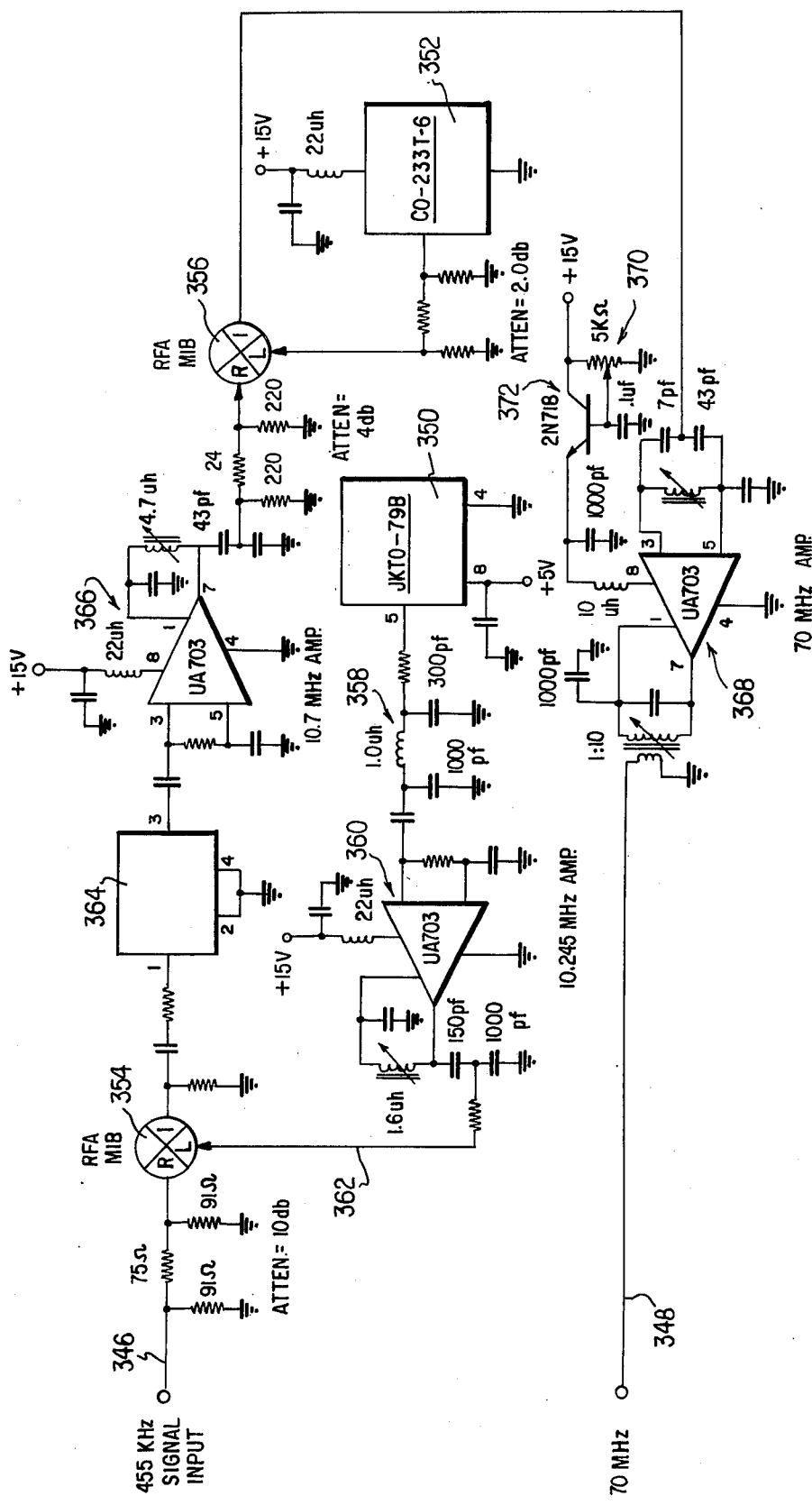
FIG. 16 is a circuit diagram of the up converter of FIG. 11.
Figure 17:
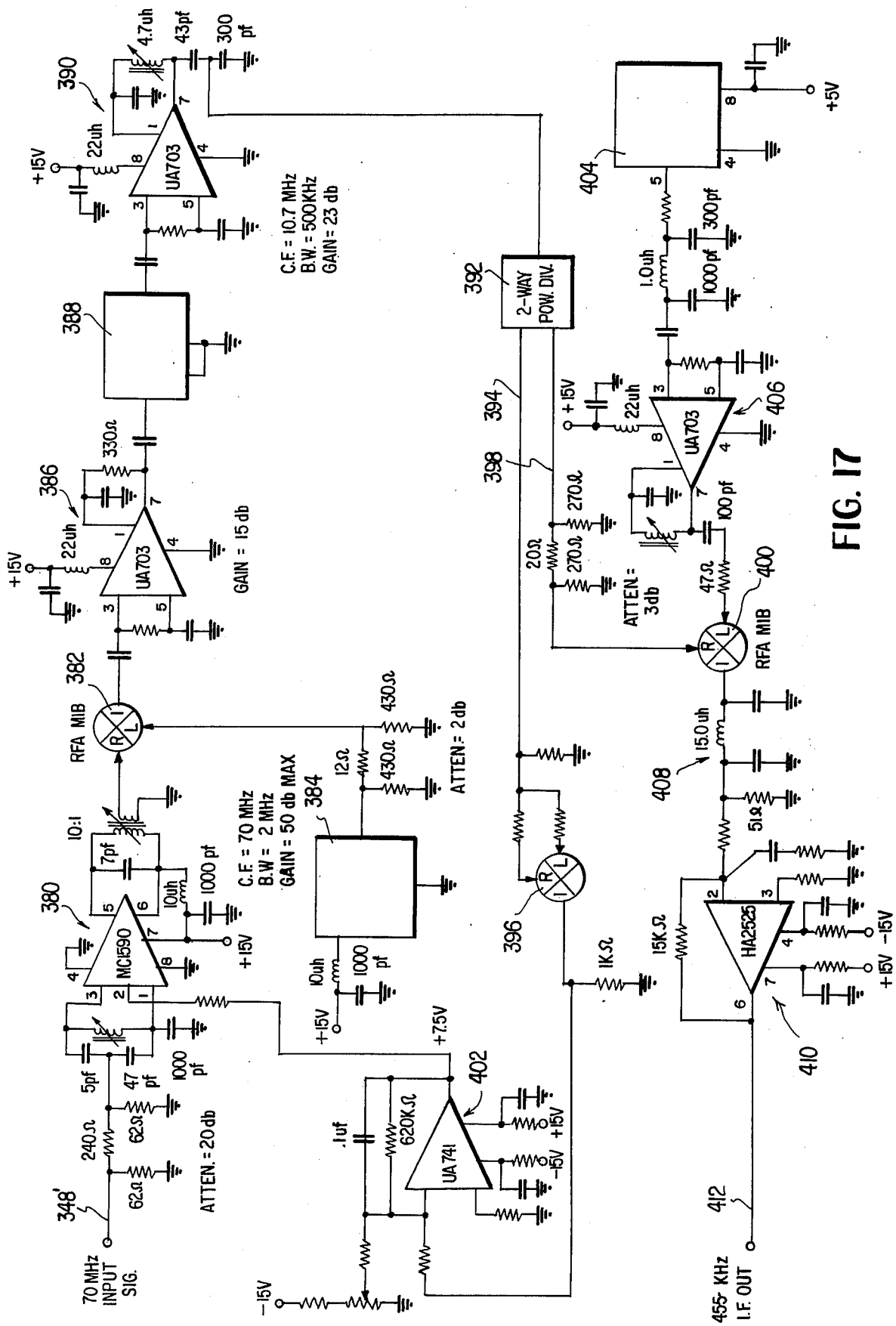
FIG. 17 is a circuit diagram of the down converter of FIG. 11.

The up-converter unit is illustrated in FIG. 16 and, as will be seen, the conversion is effected in two stages, to the intermediate conversion frequency of 10.7M Hz and then to the 70M Hz output signal at the conductor 348. For this purpose, two crystal oscillators 350 and 352 are employed respectively feeding the mixers 354 and 356. The oscillator 350 provides a stable output which is applied through the filter network 358 to the tuned amplifier 360 whose output at 362 provides the second input for the mixer stage 354. The upper and lower sideband output of the mixer stage 354 is fed to the ceramic filter 364 whose 3 dB bandwidth is 210K Hz and whose 40 dB bandwidth is 600K Hz, providing at least 50 dB suppression of the lower sideband signal at 9.790M Hz. The upper sideband signal at 10.7M Hz is amplified by the tuned amplifier 366 and this signal is applied to one input of the mixer 356. The local oscillator 352 provides the other input for the mixer stage 356 and the upper sideband output at 70M Hz from this mixer is filtered and amplified by the amplifier 368. The amplifier 368 is a double-turned RF amplifier with tuned input and output stages and its output is controlled by the potentiometer 370 controllably varying the transistor 372 to adjust the $B+$ voltage to the amplifier. The amplifier 368 has a 3 dB bandwidth of 2M Hz and a 30 dB bandwidth of 40M Hz.

In the receiver, the 70M Hz signal is fed to the conductor 348' and applied to the amplifier 380, the output of which is applied to the frequency converter stage 382. The amplifier 380 is an integrated circuit RF amplifier with tuned input and output L-C networks to match the amplifier to 50 ohms and providing at least 40 dB of image frequency rejection at 48.6M Hz. The amplifier also operates as an AGC amplifier, its gain being controlled by detecting the signal-plus-noise at 10.7M Hz and feeding back an AGC control voltage. The other input to the frequency converting stage 382 is from the local oscillator 384 and the lower sideband output from the converter 382 is applied to the I.F. section consisting of the amplifier 386, the filter 388 and the amplifier 390. The output of the amplifier 390 is applied to the power splitter 392 one of whose outputs at 394 is applied to the AGC product detector 396 and the other of whose outputs at 398 is applied to the down converter section 400. The output of the product detector 396 is applied to the AGC amplifier 402 to complete the AGC loop back to the amplifier 380. Since the bandwidth of the detected signal-plus-noise at 10.7M Hz is much narrower than the 2M Hz bandwidth of the amplifier 380, it is important to prevent noise overloading at the output of the amplifier 380. The 1 dB compression point for the amplifier 390 is $+8$ dBm and the AGC network is designed to maintain the signal-plus-noise well below this compression point.

For the converter stage 400, the local oscillator 404 provides a 10.245M Hz signal which is applied to the tuned amplifier 406, having tuned input and output. The output of the converter 400 is passed through the 3-pole low pass filter network 408 before application to the amplifier stage 410 which provides the 455K Hz intermediate frequency output signal at the conductor 412.

Figure 18:
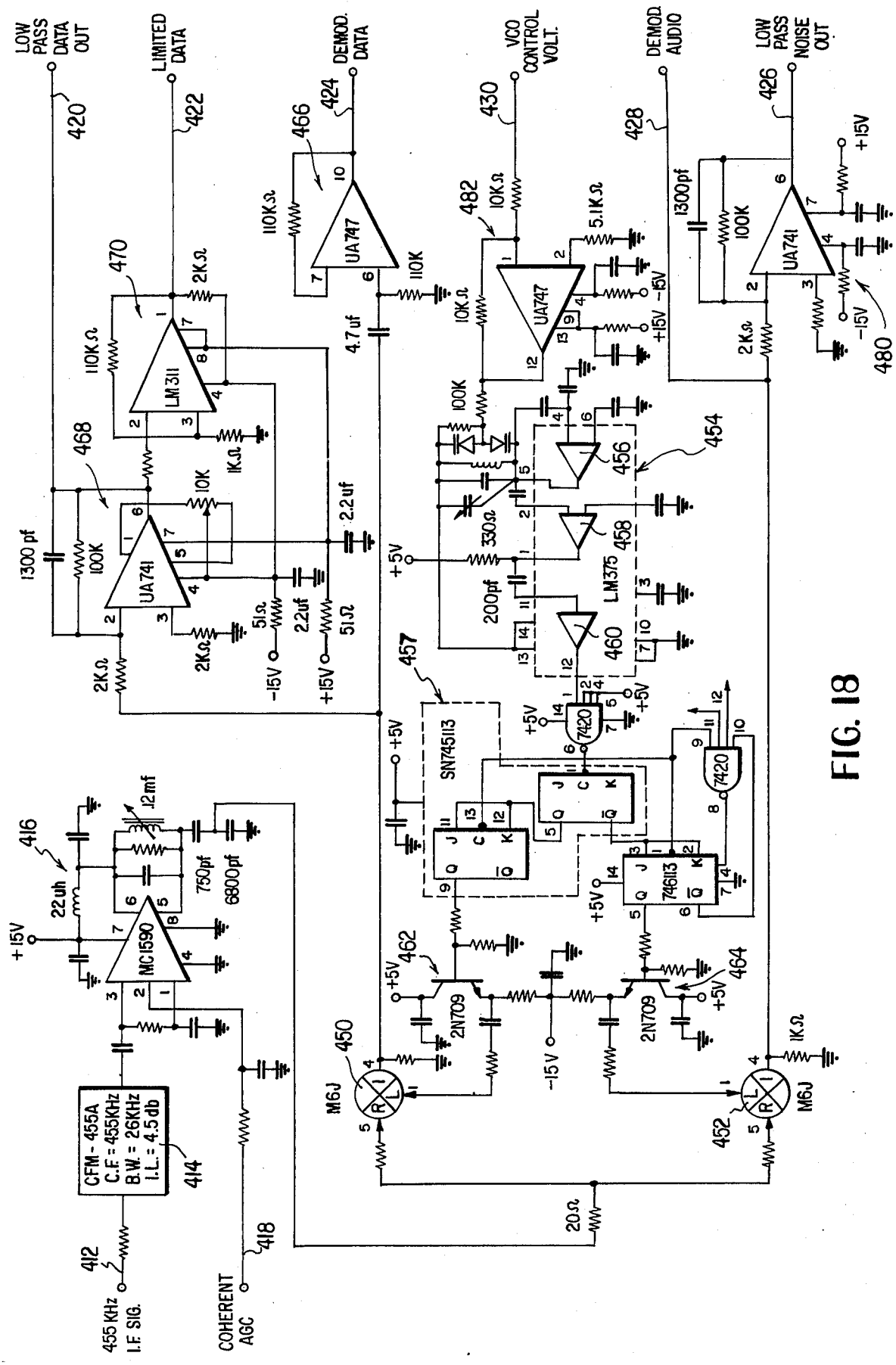
FIG. 18 is a circuit diagram of the demodulator of FIG. 11.
Figure 19:
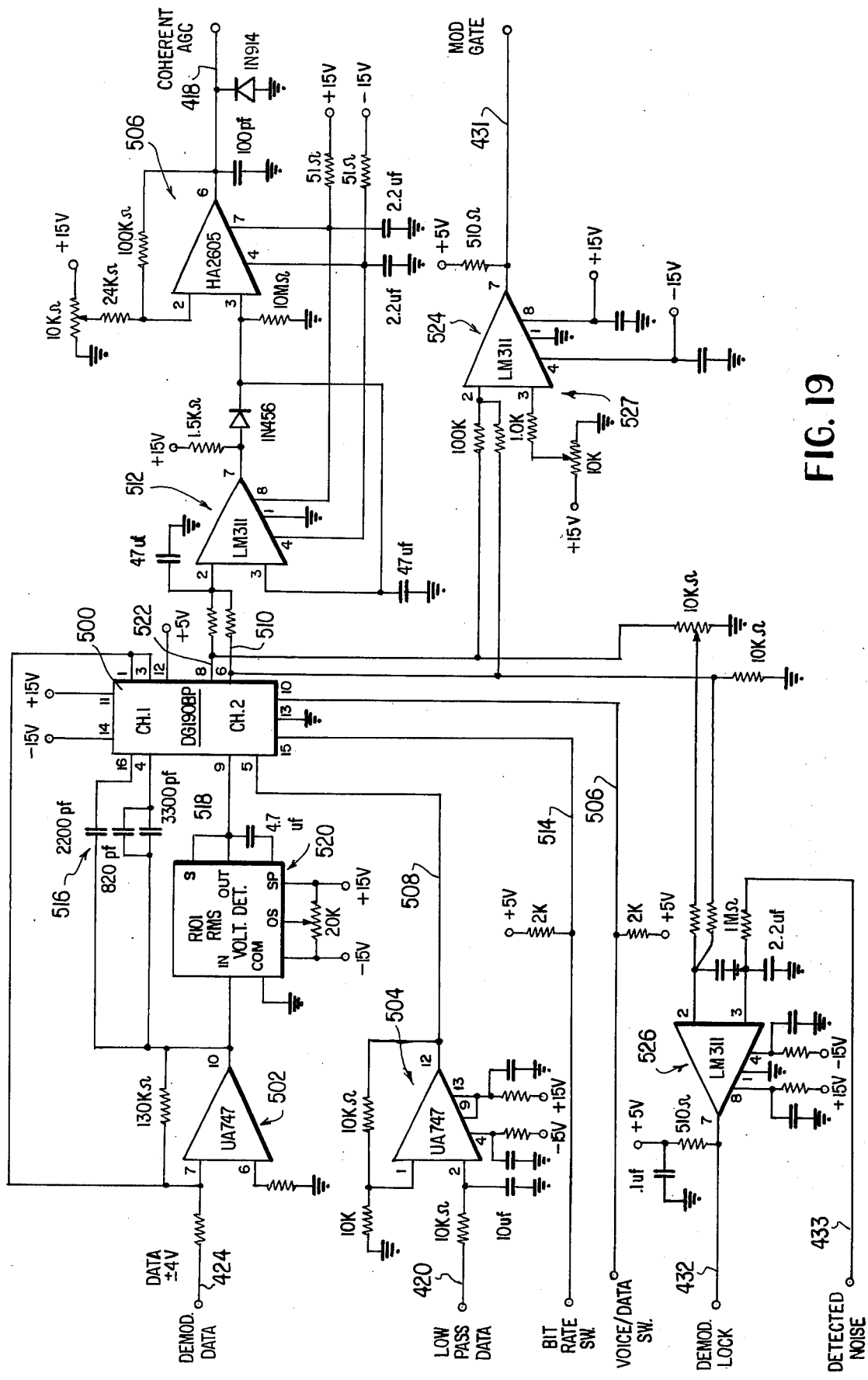
FIG. 19 is a circuit diagram of the AGC network of FIG. 11.
Figure 20:
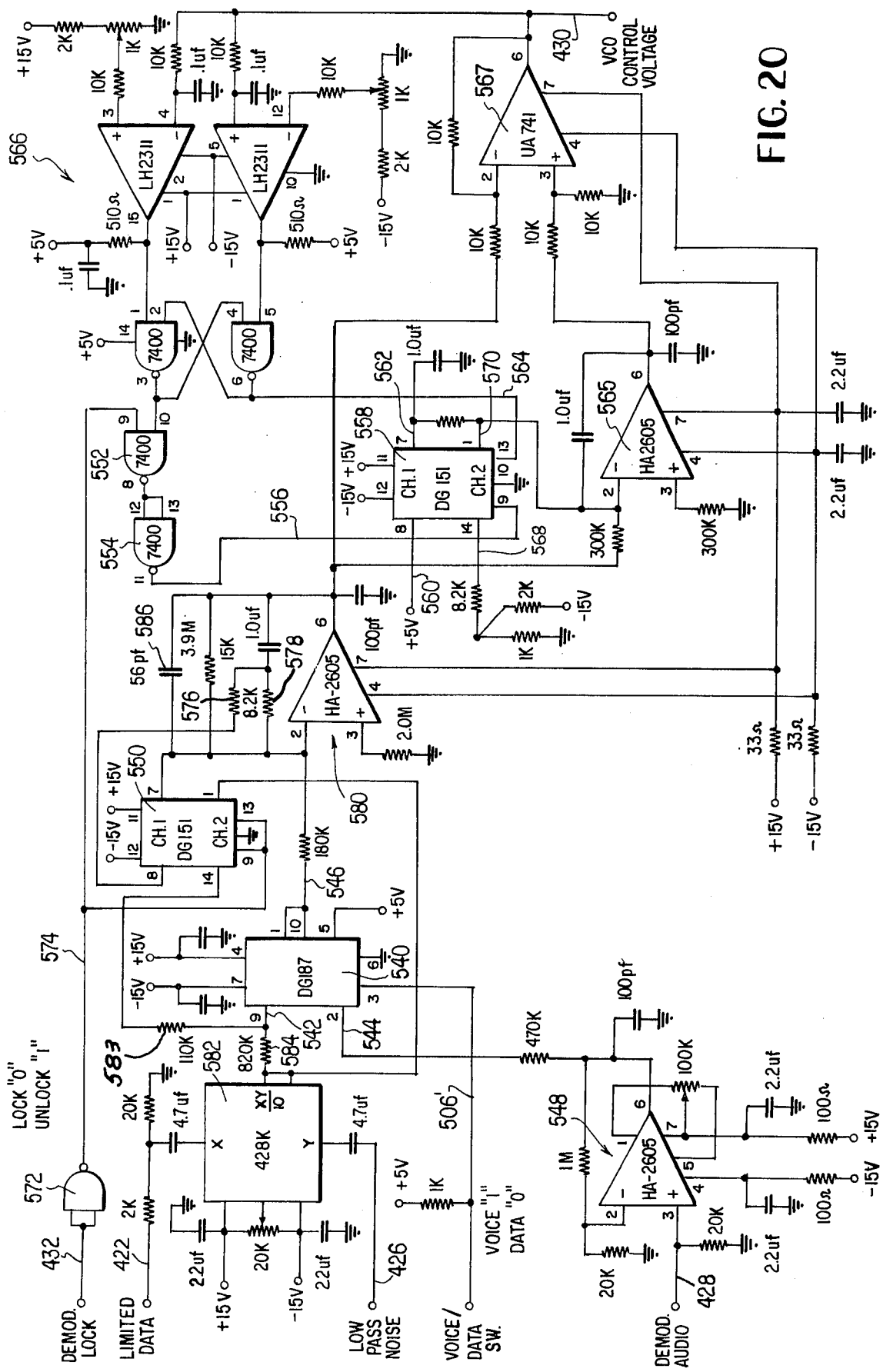
FIG. 20 is a circuit diagram of the loop filter of FIG. 11.

FIGS. 18, 19 and 20 illustrate the coherent demodulator section of the receiver. In FIG. 18, the I.F. signal at the conductor 412 is applied to the ceramic filter 414 and applied to the amplifier 416. The gain of the amplifier 416 is controlled by a coherent AGC signal at the conductor 418 derived from circuitry illustrated in FIG. 19. The output of the amplifier 416 is applied to the two doubly balanced mixers 450 and 452 which operate as phase detectors and the coherent reference signals for these mixers are derived from the 1.82M Hz voltage controlled oscillator indicated generally by the reference character 454 and the digital quadrature hybrid circuit indicated generally by the reference character 456. The VCO 454 is constructed from a National Semi-conductor LM 375 oscillator network which incorporates an oscillator network 456, a limiter/buffer network 458 and a TTL driver stage 460. The hybrid 456 is identical to the hybrid 324 illustrated in FIG. 15. Likewise, TTL-to-bipolar level converter transistors 462 and 464 are employed to provide the second inputs to the mixers 450 and 452. The output from the phase detector 450 is applied to the buffer amplifier 466 to provide, at 424, demodulated data output. The output of the phase detector 450 is also applied to the low pass active filter 468 whose output at 420 provides a low pass data output signal which is the detected carrier portion of the voice signal when the system is in the voice mode. The output of the amplifier 468 is also applied to the limiter 470 to provide the limited data output signal at the conductor 422. In the audio section, the output of the phase detector 452 is the demodulated audio signal which appears at the output conductor 428 and this signal is also applied to the active filter 480 to provide a low pass noise output signal at the conductor 426. To complete the description of FIG. 18, it will be seen that VCO control voltage signal at the conductor 430 is applied to the buffer amplifier 482 before being applied to the VCO network 454.

The coherent AGC network is illustrated in FIG. 19, same being utilized to maintain a constant level input signal to the coherent demodulator section illustrated in FIG.18. The electronic switching circuit 500 is utilized to select which of the buffer amplifiers 502 or 504 cooperates with the AGC amplifier 506. In the "voice only" mode, the voice/data selector switch signal at the conductor 506 connects the output 508 of the amplifier 504 to the output 510 of the electronic switching circuit 500 for application to the peak voltage detector network 512. Thus, at this time referring back to FIG. 18, the input of the AGC amplifier 506 is through the low pass active filter 468, the amplifier 504 and the peak voltage detector 512. The detected carrier level is held at $\pm 2$ volts as is indicated in FIG. 18. However, during periods of voice transmission the power in the carrier drops appreciably and the peak voltage detector 512 remembers the peak level during voice transmissions and transmits a continuous +2.0 volt d.c. signal to the ACG feedback amplifier 506. Incorporation of a peak detector in the AGC provides for a long time constant AGC response on the order of 5.0 seconds. In the "data only" mode, or in the voice-plus-data mode, the demodulated data signal is fed through the low pass amplifier 502 whose bandwidth is adjusted to reveive bit rate in order to maximize SNR at the output thereof. For this adjusting purpose, a bit rate signal at the conductor 514 selects whether the capacitor 516 or the parallel pair of capacitors 518 are connected to the feedback network of the amplifier 502. The output of the amplifier 502 is fed to an RMS detector 520 which provides a d.c. voltage through the switching circuit 500 to the output 522 thereof which is applied to the peak detector circuit 512. The output level of the detector circuit 520 is held to a +4.0 volts d.c.

FIG. 19 also includes the two circuits 524 and 526 respectively providing the output signals at the conductors 431 and 432. The circuit 524 is a level detector in which the detected voice carrier or detected data signal at conductors 510 or 522 is compared against a fixed threshold voltage provided by the resistor network 527. During periods of conversation the detected carrier or detected data signal will drop in voltage and this in turn will be detected by the circuit 524 to produce a logical zero or logical one at the conductor 431 which is applied to the circuitry of FIG. 21 hereinafter described. At the detector 526, the detected voice carrier or detected demodulated data signal is compared against the detector noise level at the conductor 433 from the circuit of FIG. 21. Prior to signal reception, the level of detected noise exceeds the detected signal level and the output of the circuit 526 is logical zero but upon carrier acquisition, the detected signal level exceeds the detected noise level and the signal at the conductor 432 is logical one.

In FIG. 20, a loop filter configuration is shown in which electronic switches are used to control operation of the loop filter as either a phase lock loop for voice only mode of as a Costas loop for data only or voice-plus-data. An additional electronic switch is used to switch filter components during the acquisition and track modes of operation.

The electronic switch 540 operates in conjunction with a signal on the conductor 506' selecting either the voice or data mode to switch either one of the inputs at 542 or 544 to the output 546. In the voice only mode, the amplifier 548 which is connected to the demodulated audio input at 428 is switched to the output at 546 through the electonic switch 540. At the same time, the electronic switch 550 will be open if the loop has acquired lock. Similarly, if the loop has acquired lock, the gates 552 and 554 assure that a zero input level is present at the conductor 556 so that the electronic switch 558 is open between the conductors 560 and 562. The other channel of the electronic switch 558 is controlled by the input 564 from the multivibrator circuit indicated generally by the reference character 566. This latter input controls opening and closing of the second channel of the switch 558 between the conductors 568 and 570.

When the loop has not acquired lock, the output at the gate 572 provides a logical one at the conductor 574 whereby to close both channels of the switch 550. One channel places the 15K ohm resistor 576 in parallel with the 8.2K ohm resistor 578 broadening the bandwidth of the active filter 580 whereas the other channel places the 110K ohm resistor 583 in parallel with the 820K gain resistor 584. When "voice only" is being received, the input to the active filter 580 is the amplified demodulated audio signal from the amplifier 548. It will be noted that the filter network 580 is a conventional second order loop filter with the integrating capacitor 586 added, thus making it a third order loop which provides for an increased performance over a second order loop with respect to static phase error, acquisition range and acquisition time.

Figure 21:
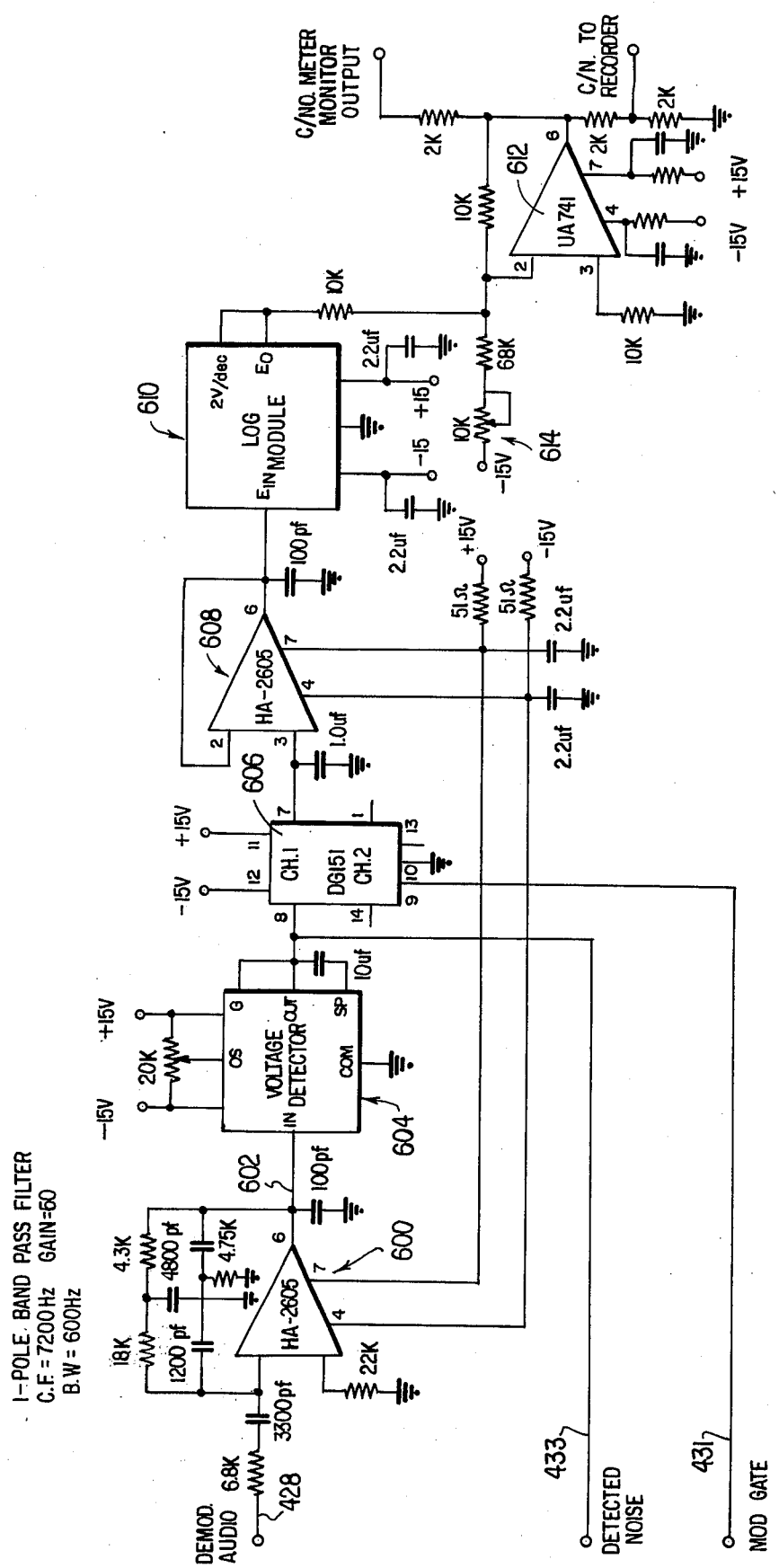
FIG. 21 is a circuit diagram of the $C/N_o$ monitor network.

The $C/N_o$ monitor circuit is illustrated in FIG. 21. As shown, the demodulated audio signal-plus-noise at the conductor 428 coming from FIG. 18 is applied to the bandpass filter 600 which is designed to accept a band of noise at about 7200 Hz and to reject lower frequency voice signals. The amplifier 600 is an active filter network with a twin-T feedback network and the filtered noise at its output 602 is fed to the RMS voltage detector 604 from whose output the detected noise output signal at 433 is obtained which, as previously described, is applied to the circuit of FIG. 19. The electronic switch 606 under control of the MOD gate signal at the conductor 431 together with the amplifier 608 constitute a sample and hold circuit. The sample and hold network stores and detected noise voltage during periods of voice transmission, thus rejecting further any voice power from the $C/N_o$ measurement, and this output is applied to the logarithmic amplifier 610 whose output is applied to the operational amplifier 612. The potentiometer 61 is adjusted so as to callibrate the front panel meter.

Figure 22:
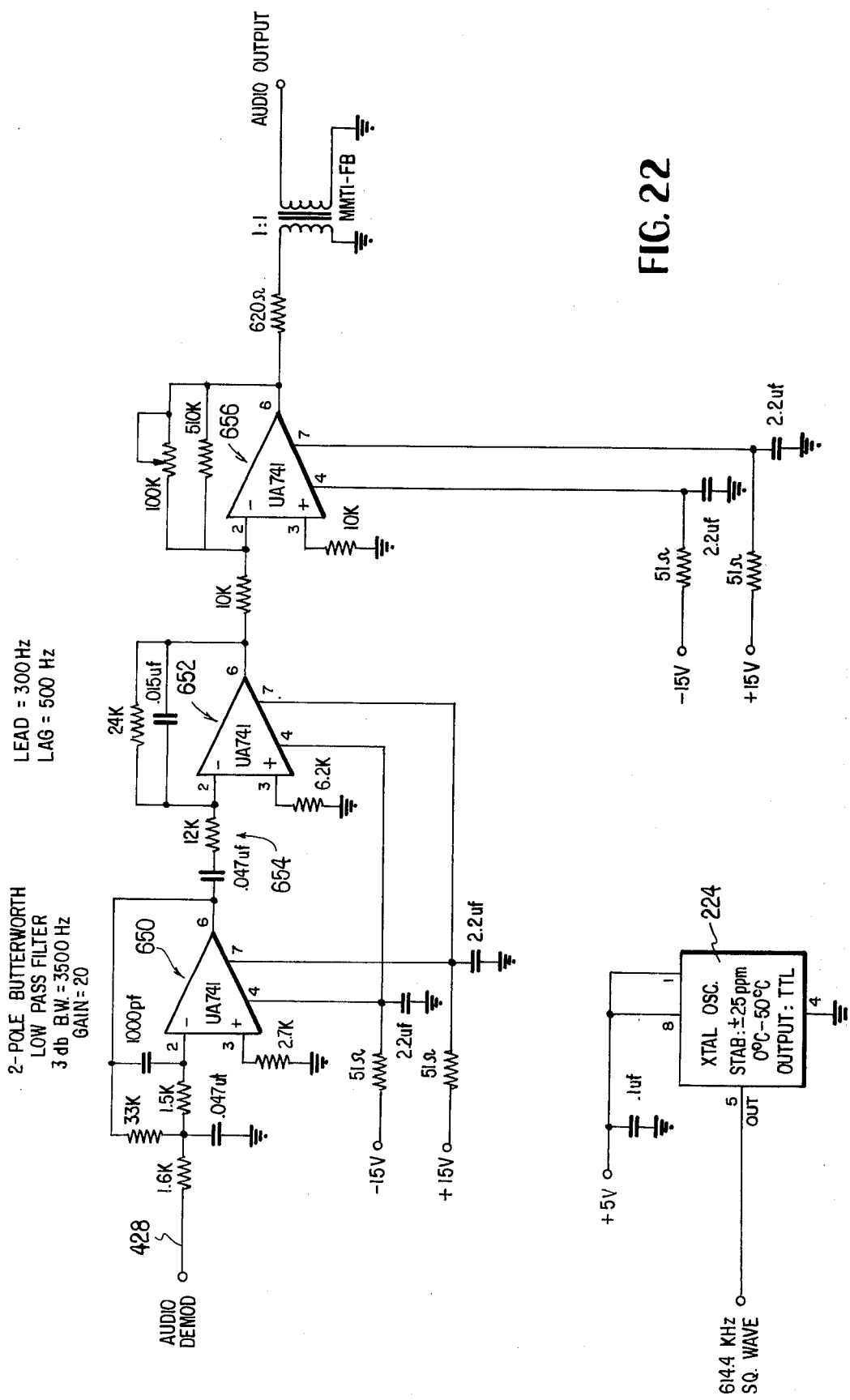
FIG. 22 is a circuit diagram of the audio output network of FIG. 11.

The audio output section is shown in FIG. 22. The demodulated audio signal is applied at the input to the low pass filter 650 and is then fed to the deemphasis network 652 via the high pass RC network 654. The low pass filter 650 restricts the received noise to a bandwidth no greater than the audio transmission bandwidth thus optimizing the signal-to-noise ratio; the high pass RC network 654 is used to eliminate noise components below 300 Hz, again improving the signal-to-noise ratio; and the voice signal is deemphasized by the network 652 at a rate of −6 dB/octave from 500 Hz to infinity, the deemphasis response being matched to the preemphasis reponse at the modulator. A suitable variable gain amplifier 656 is provided to drive the appropriate equipment.

Figure 23:
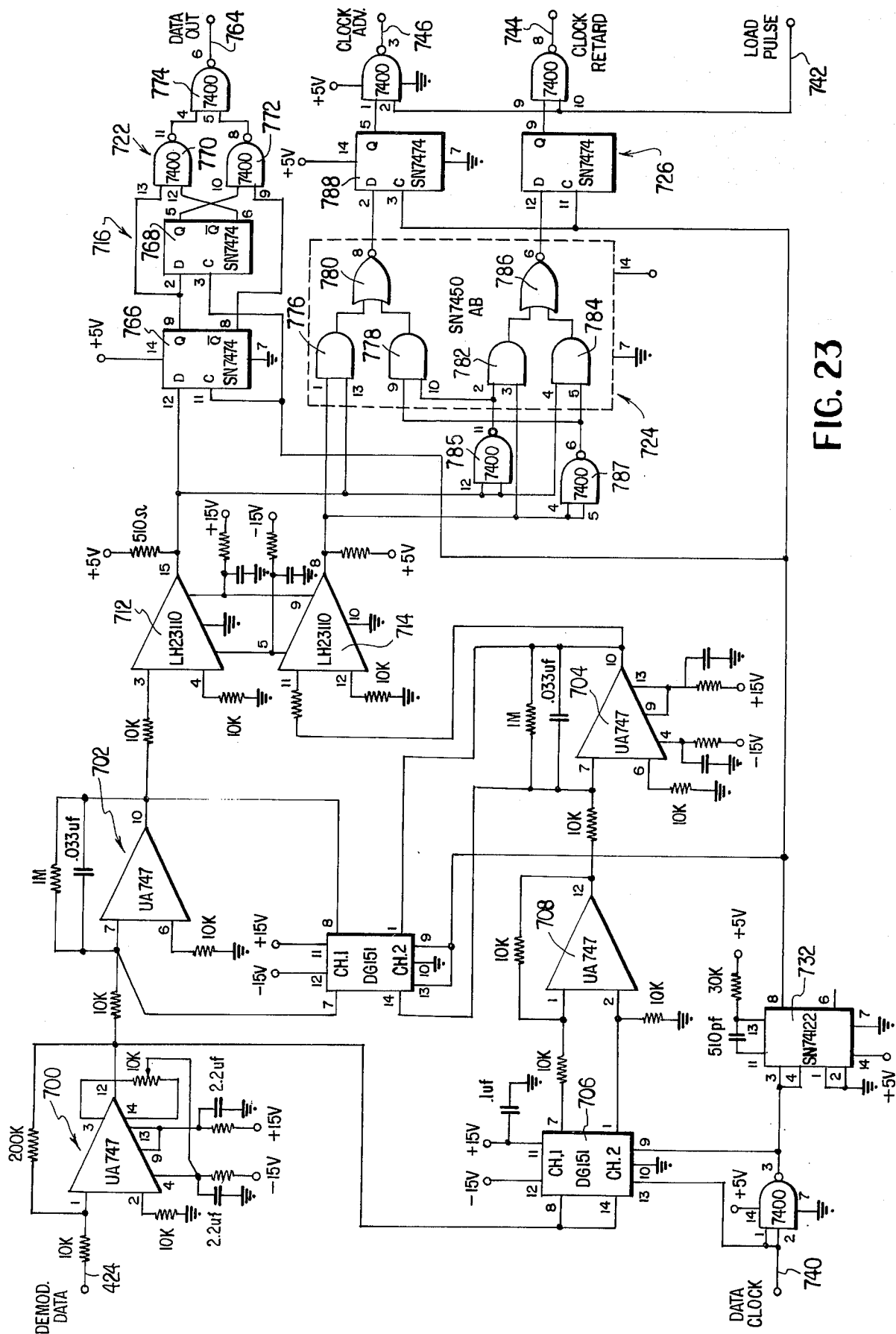
FIG. 23 is a circuit diagram of the integrate and dump network of FIG. 11.
Figure 24:
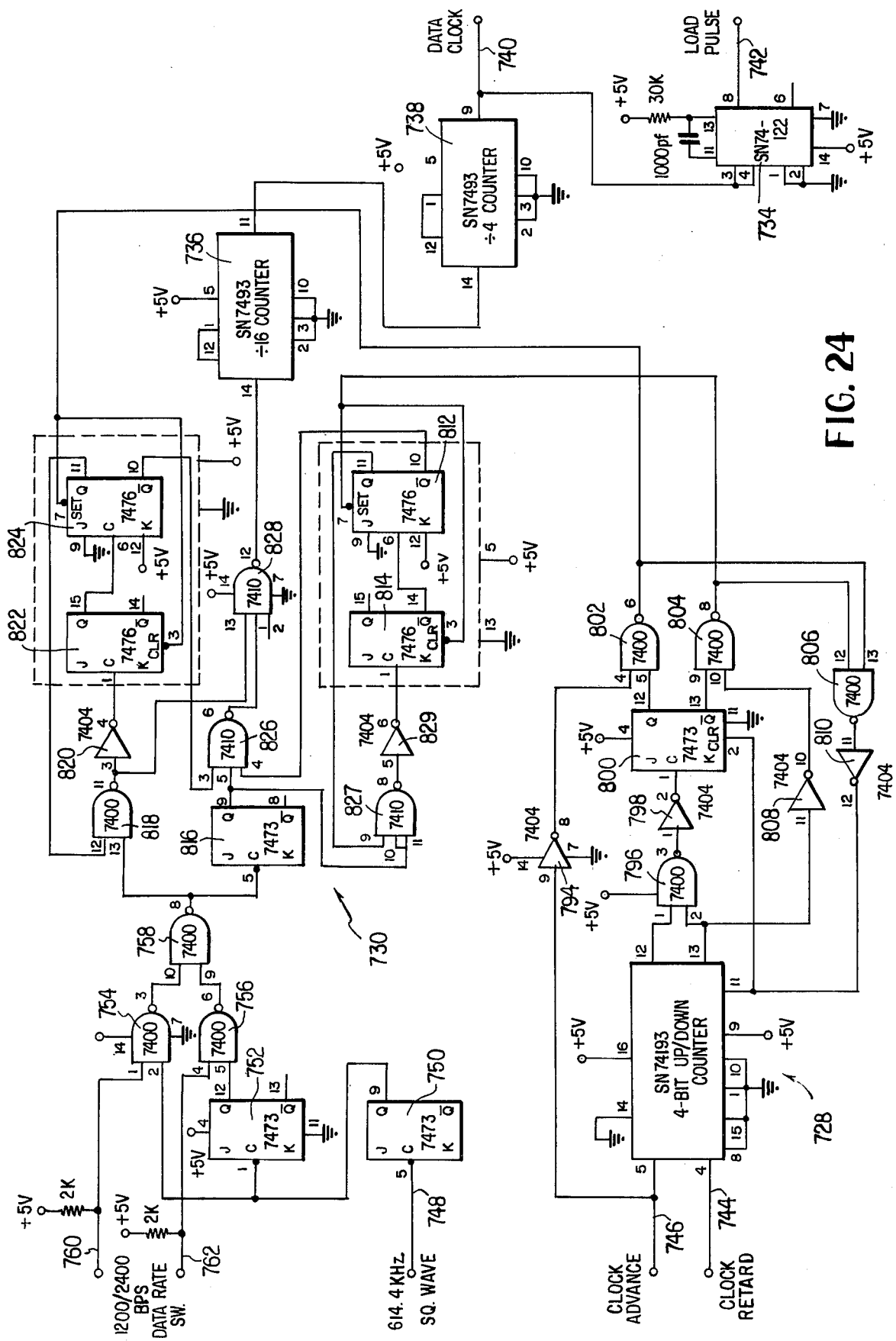
FIG. 24 is a circuit diagram of the synchronization loop of FIG. 11.

The integrate and dump network and the clock synchronization loop together with clock input are illustrated in FIGS. 23 and 24. As shown in FIG. 23, the demodulated data at 424 is applied to the amplifier 700 which provides outputs to the two integrate and dump networks 702 and 704. The data is amplified to a level of 0.8 volts peak to peak at the outputs of the amplifier 700 and at the network 702, the received data bit is integrated over the full bit period. The integrate and dump network 704 is preceeded by the chopper 706 and amplifier 708 so that the data is first chopped by the clock signal at 710. The chopping procedure results in a signal inversion half way through each bit period so that while the output of the network 702 integrates to some positive or negative level at the end of each bit period, the output of the network 704 integrates to zero volts over each bit period. At the end of each bit period a level detector 712 is used to determine the polarity of the integrate and dump network 702 whereas the level detector 714 determines the polarity of the output of the network 704. THe output of the network 702 is the received data signal and it is fed through a two-stage shift register 716 whose parallel outputs at 718 and 720 are differentially decoded in an enclusive OR network 722. The decoding sequence is as follows:

| BIT N | BIT N-1 | OUTPUT at Exclusive OR |
|---|---|---|
| 0011 | 0101 | 0110 |

Figure 25:
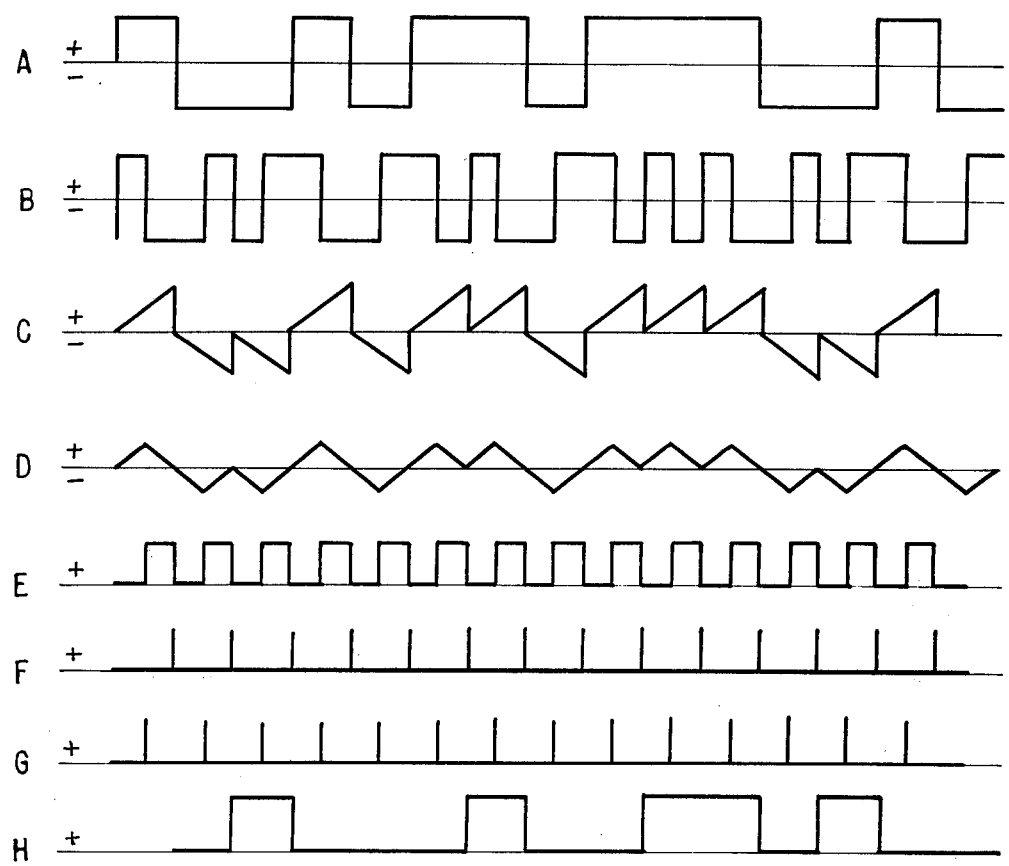
FIG. 25 is a timing diagram associated with FIG. 27.

With regard to the network 704, if the local clock is in bit synchronization with the received data, the output of the network 704 will integrate to zero volts during each bit period. However, if the local clock leads or lags the received data stream, then the output of the network 704 will integrate to some positive or negative voltage, see particularly FIG. 25. The polarity of the output of the network 704 is compared in an exclusive OR network 724 against the polarity of the output of the network 702. If the local clock lags the received data, the polarities of the two networks 702 and 704 are opposite and a clock advance signal will be stored in the two-bit storage register −26. Similarly, if the local clock leads the received data, the polarities of the two networks 707 and 704 are the same and a clock retard signal is stored in the two-bit storage register 726. In the middle of each bit period the contents of the storage register 726 are loaded into a four-bit up-down counter 728 which, when it accumulates an unanimous count of all ones or all zeros, adds or substracts a phase step from the local clock output signal at 710. At the same time, the up-down counter is reset to an initial count of 1000 and it begins to accumulate advance or retard counts again.

The size of the clock phase step is determined by the division ratio of the local clock. For 1200 BPS operation the 614.4K Hz crystal clock is divided by four to generate a 153.6K Hz reference which is sent to the add/subtract clock pulse network 730. Under normal conditions, the 153.6K Hz clock is divided by two and then by sixty-four to generate a 1200 Hz clock signal and phase steps of one sixty-fourth the bit period are added to or subtracted from the resulting 1200 Hz clock. For 2400 BPS operation, the 614.4K Hz crystal oscillator signal is divided by two and fed to the add-/subtract network where again one sixty-fourth phase steps are added to or subtracted from the local clock. The one sixty-fourth phase steps correspond to discrete phase increments of about 5.6°. The advancing or retarding of the local clock in discrete steps keeps this clock in bit synchronization with the received data. The two monostable multivibrators 732 and 734 provide the two control pulse signals as indicated.

Figure 28A:
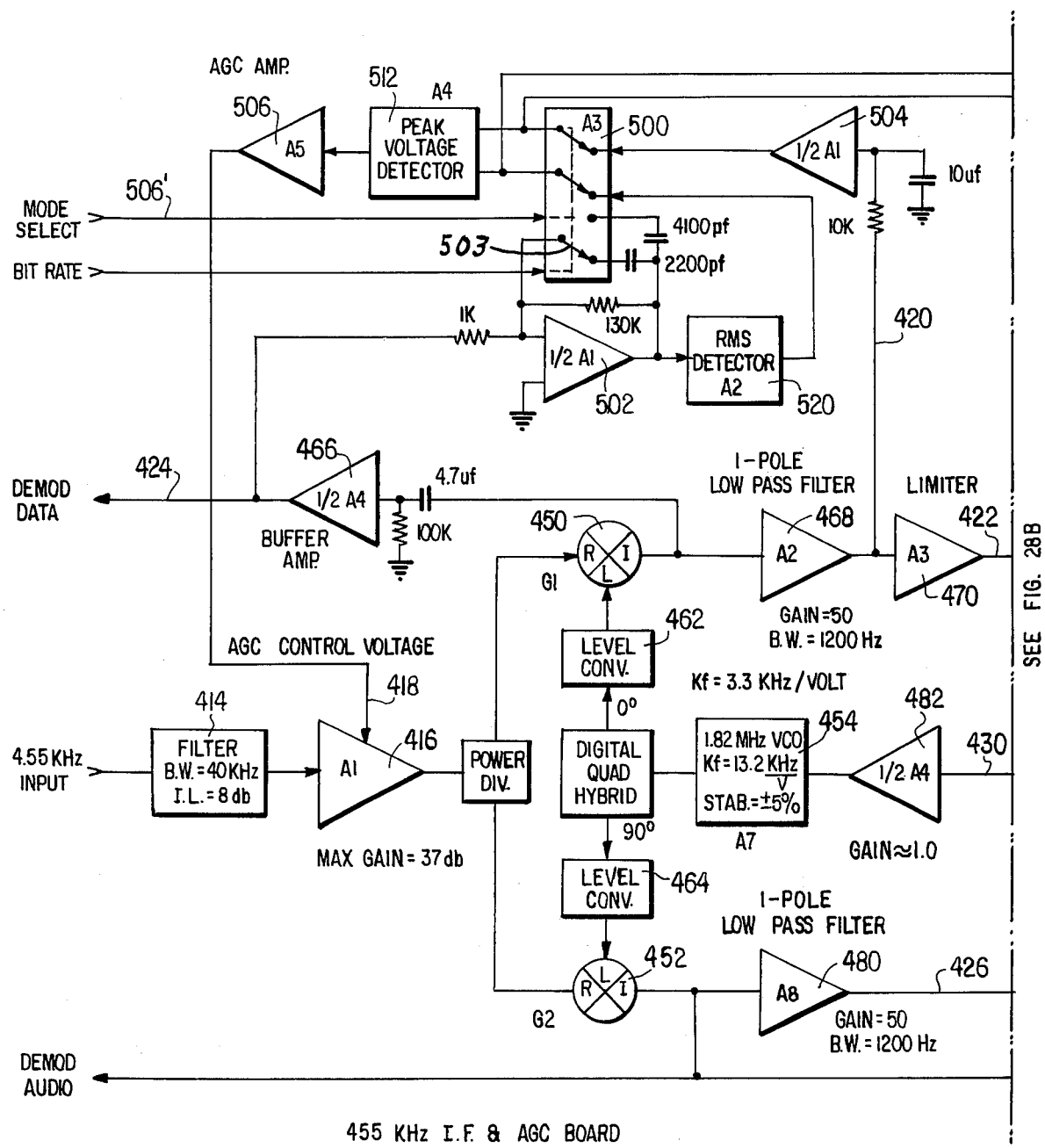
FIGS. 28A and 28B constitute a block diagram illustrating the relationships of FIGS. 18-20.
Figure 28B:
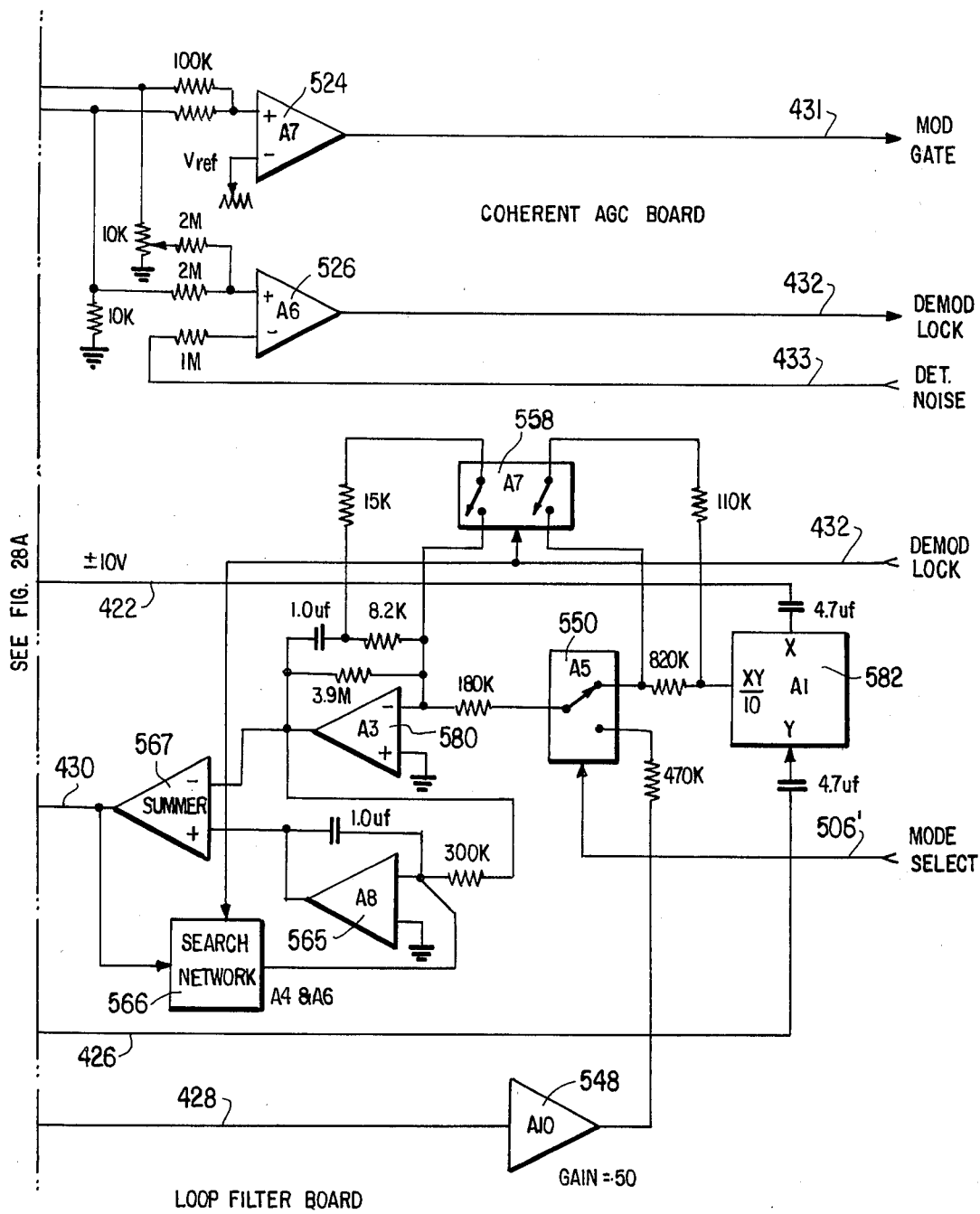

FIGS. 28A and 28B serve to illustrate the relationship between the circuits of FIGS. 18-20. The coherent AGC circuit of FIG. 19 serves to maintain a constant level input signal to the tracking loop during carrier tracking periods. During voice-only mode, the detected carrier portion of the transmitted voice signal after low pass filtering at the R-C amplifier 504 is fed through the switch 500 to the peak voltage detector 512. As mentioned before, the carrier power drops appreciably when voice signals are transmitted but the detector 512 maintains the level applied to the amplifier 506 at that value which existed in the absence of voice signal transmission. The result is a constant level signal which is applied to the AGC amplifier 416. Similarly, in data-only or in voice-plus-data modes, the mode select signal at 506' causes the switch 500 to disconnect the amplifier from the detector 512 and to connect the detector 520 to the detector 512. At this time, the demodulated data signal is fed through the low pass R-C amplifier 502, the bandwidth of which is adjusted according to the received bit rate in order to maximize the signal-to-noise ratio at the output of the amplifier 502. The bit rate selection switches the feedback capacitors across the amplifier 502, as illustrated by the switch 503 to determine the low pass response of this amplifier, and its output is fed to the RMS detector 520 which provides a d.c. voltage through the switch 500 to the peak voltage detector 512. The output level of the detector 52 is held to +4.0 VDC.

At the Mod Gate level detector 524, the detected voice carrier or the detected data signal is compared against a fixed threshold voltage Vref. During periods of conversation the detected carrier or detected data signal will drop in voltage, which is detected by the circuit 524 to provide a Mod Gate signal at the conductor 431 which is applied to the $C/N_o$ monitor network, FIG. 21. At the Demod Lock level detector 526, the detected voice carrier or detected data signal is compared against the detected noise level signal at the conductor 433 from the monitor network of FIG. 21. Prior to signal reception, the level of the detected noise exceeds the detected carrier or detected data level and the Demod Lock signal at the conductor 432 is logic "0". Upon carrier acquisition, the detected signal level exceeds the detected noise level and the Demod Lock signal is a logic "1".

Figure 26:
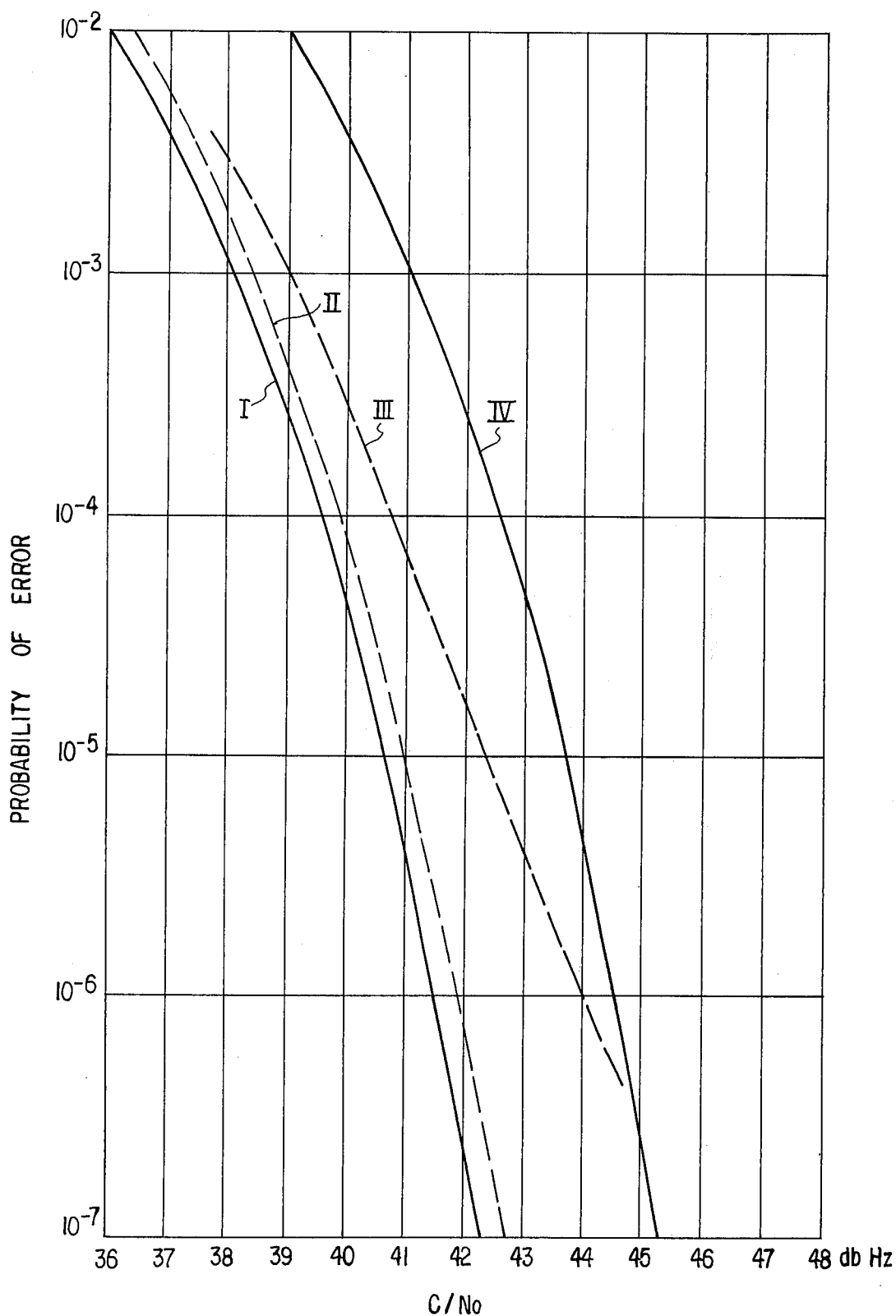
FIG. 26 is a set of performance curves for the system.
Figure 27:
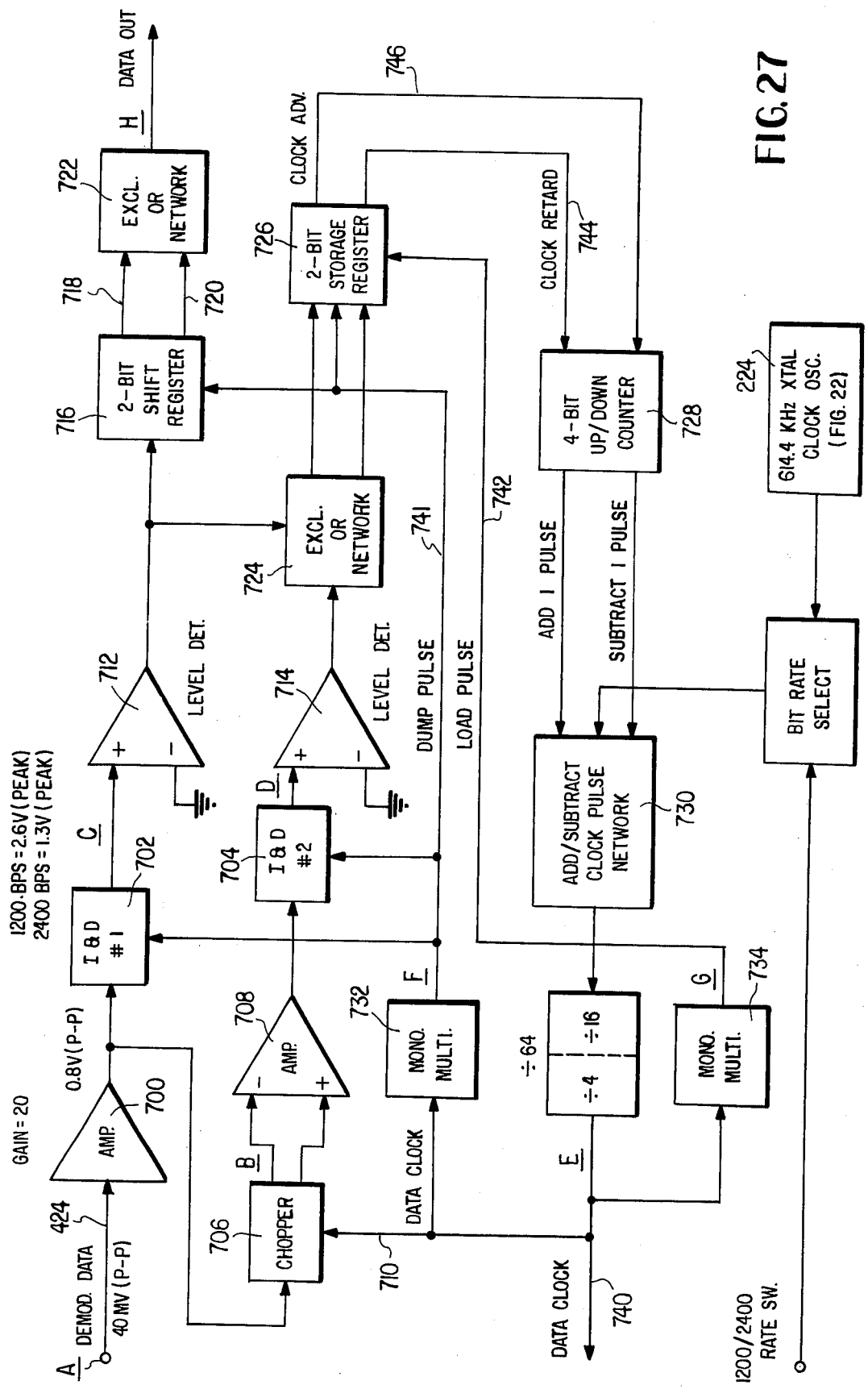
FIG. 27 is a block diagram illustrating certain principles of the integrate and dump circuit and associated synchronization circuit.

The performance of the system herein will be appreciated from a study of FIG. 26. In this Figure, curves I and IV respectively represent the theoretical performance of a DCPSK communication system transmitting data at a rate of 1200 bits per second whereas the curve IV represents the theoretical performance of the same system in voice plus data mode with power evenly split between voice and data (data rate of 1200bps). Curve II represents the results of the present invention in data only mode at 1200bps whereas curve III represents the results of the present invention in the voice plus data mode.

What is claimed is:

1. A narrowband phase modulation voice communication system characterized by the absence of thresholding effects at useful signal-to-noise ratios, comprising in combination:

transmitter means for transmitting a signal having a voice signal component and receiver means for receiving the transmitted signal;

said transmitter means including carrier signal generator means for generating a carrier signal of fixed amplitude, voice signal input means for generating a voice signal, and phase modulator means connected to said carrier signal and to said voice signal for producing a resultant signal in the form of a variable amplitude resultant signal having a voice signal component and a fixed amplitude carrier signal component in phase quadrature, said voice signal component having a maximum amplitude whereby said resultant signal has a maximum phase deviation $\phi$ which is large with respect to but less than 90° such that sin $\phi \neq \phi$, and limiter means connected to said phase modulator means for limiting said resultant signal to a constant amplitude signal whereby said carrier signal component is of variable amplitude and said voice signal component is attenuated; and said receiver means including phase locked loop demodulator means for coherently tracking said variable amplitude carrier component to recover said attenuated voice signal component.

2. A narrowband phase modulation system as defined in claim 1 wherein said transmitter means also includes means for preemphasizing said voice signal prior to quadrature modulation and said receiver means also includes means for deemphasizing the demodulated signal to restore the voice signal and attenuate noise at higher frequencies.

3. A narrowband phase modulation voice communication system as defined in claim 1 wherein said maximum phase deviation of said resultant signal is in the order of 60° and the 3 dB bandwidth of said tracking loop is in the order of 5000 Hz.

4. A narrowband phase modulation system according to claim 1 wherein said transmitter means also includes digital data input means for reversing the phase of said carrier component in accord with digital data to be transmitted; and said demodulator means comprises an in-phase detector and a quadrature phase detector both receiving the transmitted signal, a voltage controlled oscillator having an output applied to said in-phase detector, a quadrature phase shifter receiving the output of said voltage controlled oscillator and having an output connected to said quadrature phase detector, a multiplier receiving the outputs of said detectors and having an output connected to said voltage controlled oscillator.

5. The method of voice communicating by means of radiant energy transmission and reception, which comprises the steps of:
   a. phase modulating a sinusoidal carrier signal with a voice signal to produce a resultant signal which consists of said carrier signal and said voice signal as quadrature components, the maximum amplitude of said voice signal component being sufficiently large with respect to said carrier signal component that the maximum phase deviation $\phi$ of said resultant signal with respect to the carrier signal component is less than but large with respect to 90° so that $\sin \phi \neq \phi$;
   b. hard limiting said resultant signal to provide a constant amplitude resultant signal;
   c. transmitting said constant amplitude resultant signal at a selected frequency;
   d. receiving the transmitted signal; and
   e. demodulating the received signal by coherently tracking its carrier component while recovering its voice signal component whereby the demodulation process is unaffected by thresholding.

* * * * *

UNITED STATES PATENT OFFICE
CERTIFICATE OF CORRECTION

Patent No. 4,053,834  Dated Oct. 11, 1977

Inventor(s) Theodore Lerner

It is certified that error appears in the above-identified patent and that said Letters Patent are hereby corrected as shown below:

Col. 7, line 23, "combines" should be ---combiner---.

Col. 7, line 68, "mush" should be ---much---.

Col. 8, line 52 "clock 244" should be ---clock 224---.

Col. 9, line 9, "dimolulator" should be ---demodulator---.

Col. 9, line 37, "is" should be ---in---.

Col. 9, line 52, "ofter" should be ---often---.

Col. 9, line 63, "signals. large" should be ---signals.  Thus large---.

Col. 10, line 33, "gate 194" should be ---gate 294---.

Col. 10, line 34, "196" should be ---296---.

UNITED STATES PATENT OFFICE
CERTIFICATE OF CORRECTION

Patent No. 4,053,834　　　　　　　　　Dated Oct. 11, 1977

Inventor(s) Theodore Lerner

It is certified that error appears in the above-identified patent and that said Letters Patent are hereby corrected as shown below:

Col. 11, line 42, "double-turned" should be ---double-tuned---.

Col. 14, line 26, "and detected" should be ---the detected---.

Col. 14, line 31, "61" should be ---164---.

*Signed and Sealed this*

*Sixth* Day of *June 1978*

[SEAL]

Attest:

RUTH C. MASON
*Attesting Officer*

DONALD W. BANNER
*Commissioner of Patents and Trademarks*